United States Patent
Ogasawara et al.

(10) Patent No.: US 10,015,402 B2
(45) Date of Patent: Jul. 3, 2018

(54) ELECTRONIC APPARATUS

(71) Applicant: Fumihiko Inoue, Kyoto (JP)

(72) Inventors: Yoshiyasu Ogasawara, Kyoto (JP);
Kazuyoshi Osawa, Otsu (JP);
Tomohisa Kawakami, Kizugawa (JP);
Shinichi Kinuwaki, Kyoto (JP);
Fumihiko Inoue, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 0 days.

(21) Appl. No.: 14/842,222

(22) Filed: Sep. 1, 2015

(65) Prior Publication Data

US 2016/0073033 A1 Mar. 10, 2016

(30) Foreign Application Priority Data

Sep. 8, 2014 (JP) ................. 2014-182584
Sep. 8, 2014 (JP) ................. 2014-182585
Sep. 8, 2014 (JP) ................. 2014-182587
Sep. 8, 2014 (JP) ................. 2014-182591
Feb. 10, 2015 (JP) ................. 2015-023952

(51) Int. Cl.
| | |
|---|---|
| H04N 5/232 | (2006.01) |
| H04N 5/225 | (2006.01) |
| G06F 3/041 | (2006.01) |
| A63F 13/21 | (2014.01) |
| A63F 13/28 | (2014.01) |

(Continued)

(52) U.S. Cl.
CPC ....... *H04N 5/23293* (2013.01); *A63F 13/213* (2014.09); *A63F 13/285* (2014.09); *A63F 13/428* (2014.09); *A63F 13/92* (2014.09); *G06F 3/041* (2013.01); *G06K 9/00389* (2013.01);

(Continued)

(58) Field of Classification Search
CPC ...................................................... G06F 3/041
See application file for complete search history.

(56) References Cited

U.S. PATENT DOCUMENTS

2008/0059578 A1 3/2008 Albertson et al.
2008/0273755 A1 11/2008 Hildreth
(Continued)

FOREIGN PATENT DOCUMENTS

JP 10-228347 A 8/1998
JP 2006-271663 10/2006
(Continued)

OTHER PUBLICATIONS

Immersion Corporation, U.S. and International Patents as of Jul. 1 2017, https://www.immersion.com/legal/#patents, retrieved on Feb. 19, 2018.*

(Continued)

*Primary Examiner* — Timothy J Henn
(74) *Attorney, Agent, or Firm* — Nixon & Vanderhye P.C.

(57) ABSTRACT

An exemplary portable electronic apparatus includes a display provided at a front surface, and an infrared camera and a distance measuring sensor which are provided at a side surface. When a user holds the portable electronic apparatus with their left hand and makes a gesture with their right hand, the portable electronic apparatus analyzes an image from the infrared camera to detect the gesture made by the user. The portable electronic apparatus displays an image corresponding to a result of detection of the gesture on the display.

17 Claims, 22 Drawing Sheets

(51) Int. Cl.
*A63F 13/42* (2014.01)
*A63F 13/92* (2014.01)
*G06K 9/00* (2006.01)
*G06K 9/20* (2006.01)
*A63F 13/428* (2014.01)
*A63F 13/213* (2014.01)
*A63F 13/285* (2014.01)

(52) U.S. Cl.
CPC ......... *G06K 9/2018* (2013.01); *H04N 5/2252* (2013.01); *H04N 5/23229* (2013.01)

(56) References Cited

U.S. PATENT DOCUMENTS

| | | | |
|---|---|---|---|
| 2009/0139778 A1* | 6/2009 | Butler | G06F 1/1626 |
| | | | 178/18.03 |
| 2010/0062833 A1 | 3/2010 | Mattice | |
| 2011/0242134 A1* | 10/2011 | Miller | G06T 19/006 |
| | | | 345/633 |
| 2012/0038582 A1 | 2/2012 | Grant | |
| 2012/0062558 A1 | 3/2012 | Lee et al. | |
| 2012/0100900 A1* | 4/2012 | Su | A63F 13/235 |
| | | | 3/235 |
| 2012/0242793 A1 | 9/2012 | Im et al. | |
| 2012/0268376 A1 | 10/2012 | Bi | |
| 2013/0050069 A1* | 2/2013 | Ota | G06F 3/011 |
| | | | 345/156 |
| 2013/0050076 A1 | 2/2013 | Hong et al. | |
| 2014/0015210 A1 | 1/2014 | Pasek | |
| 2014/0157210 A1 | 6/2014 | Katz et al. | |
| 2014/0267084 A1* | 9/2014 | Krulce | G06F 3/0416 |
| | | | 345/173 |
| 2015/0009124 A1* | 1/2015 | Antoniac | G06K 9/00389 |
| | | | 345/156 |
| 2015/0169073 A1 | 6/2015 | Isayama | |
| 2015/0277566 A1* | 10/2015 | Musgrave | H04N 5/23241 |
| | | | 345/156 |
| 2016/0270186 A1* | 9/2016 | Li | H05B 37/0218 |
| 2016/0334877 A1* | 11/2016 | Yousefi | G06K 9/00389 |

FOREIGN PATENT DOCUMENTS

| | | |
|---|---|---|
| JP | 2013-541110 A | 11/2013 |
| JP | 5507773 B1 | 5/2014 |
| WO | 2013/046030 A2 | 4/2013 |
| WO | 2013/158433 A1 | 10/2013 |

OTHER PUBLICATIONS

Ogasawara et al., U.S. Appl. No. 14/842,275, filed Sep. 1, 2015.
Office Action dated May 2, 2017 in related U.S. Appl. No. 14/842,275, 13 pages.
Immersion Corporation, U.S. and International Patents as of Jul. 1, 2017, https://www.immersion.com/legal/#patents.
Office Action dated Feb. 28, 2018, issued in related U.S. Appl. No. 14/842,275.
Office Action dated Oct. 5, 2017 in related U.S. Appl. No. 14/842,275, 19 pages.
Notice of Reasons for Refusal dated Mar. 14, 2018, issued in corresponding Japanese Patent Application No. 2014-182587.

* cited by examiner

VIBRATION AND SOUND OUTPUT

F I G. 1 3
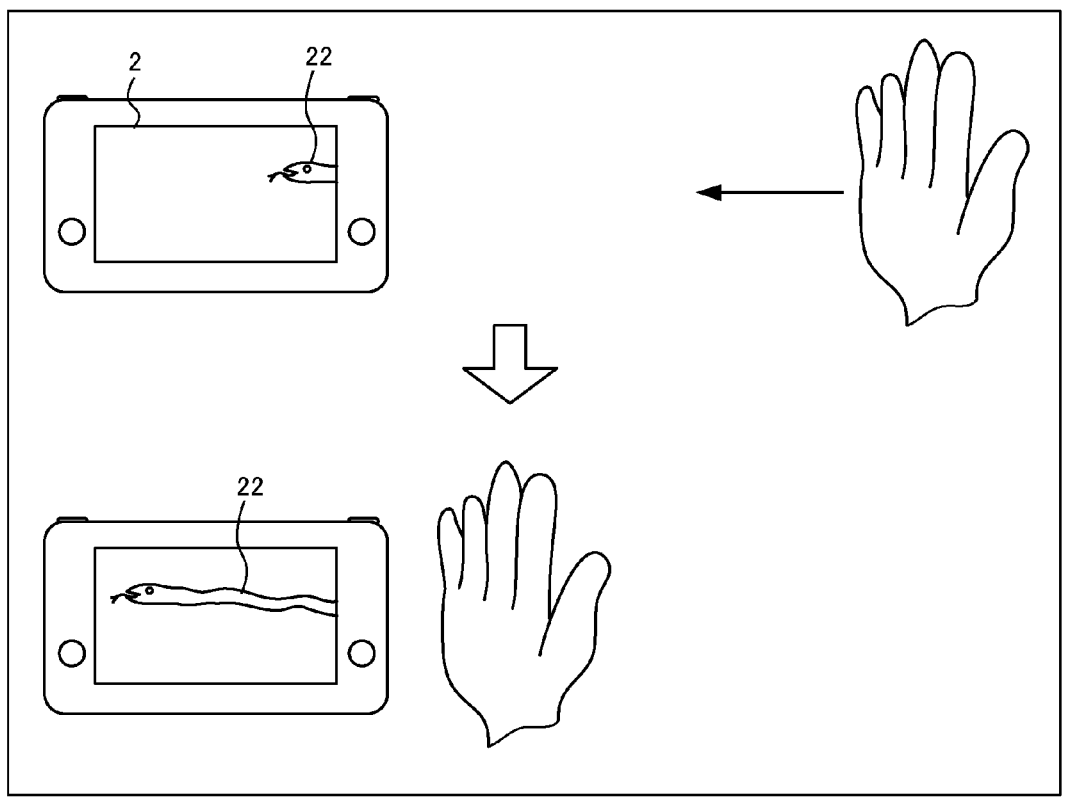

FIG. 14
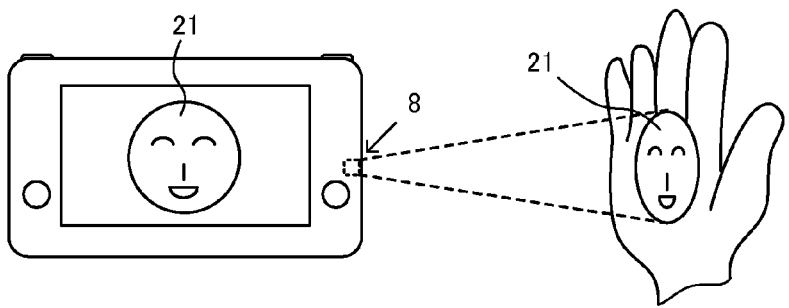
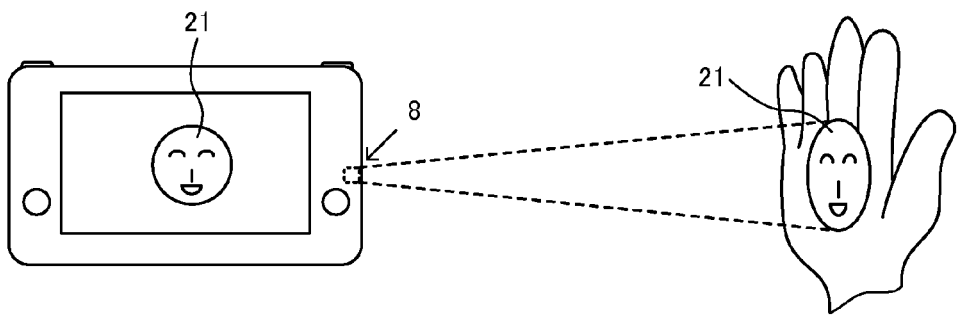
FIG. 15
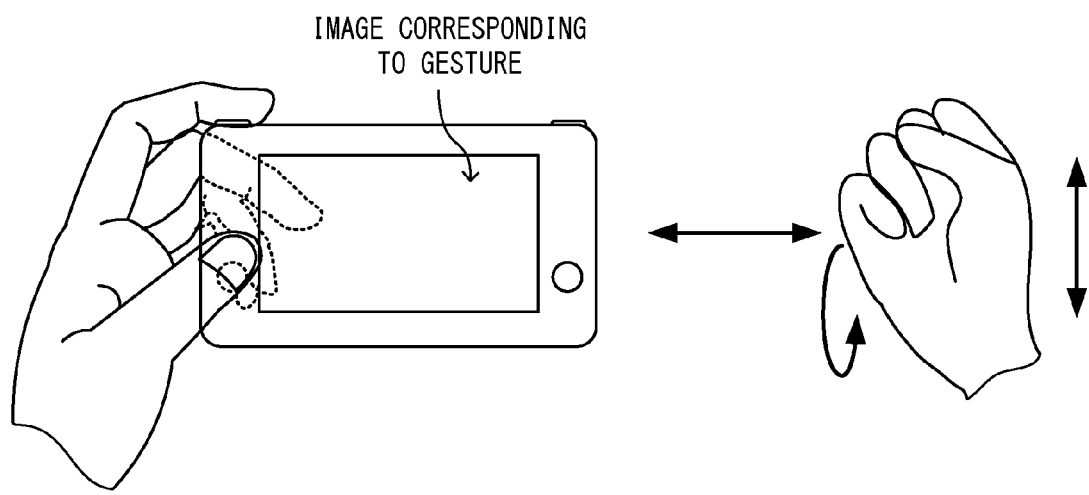

F I G. 1 8
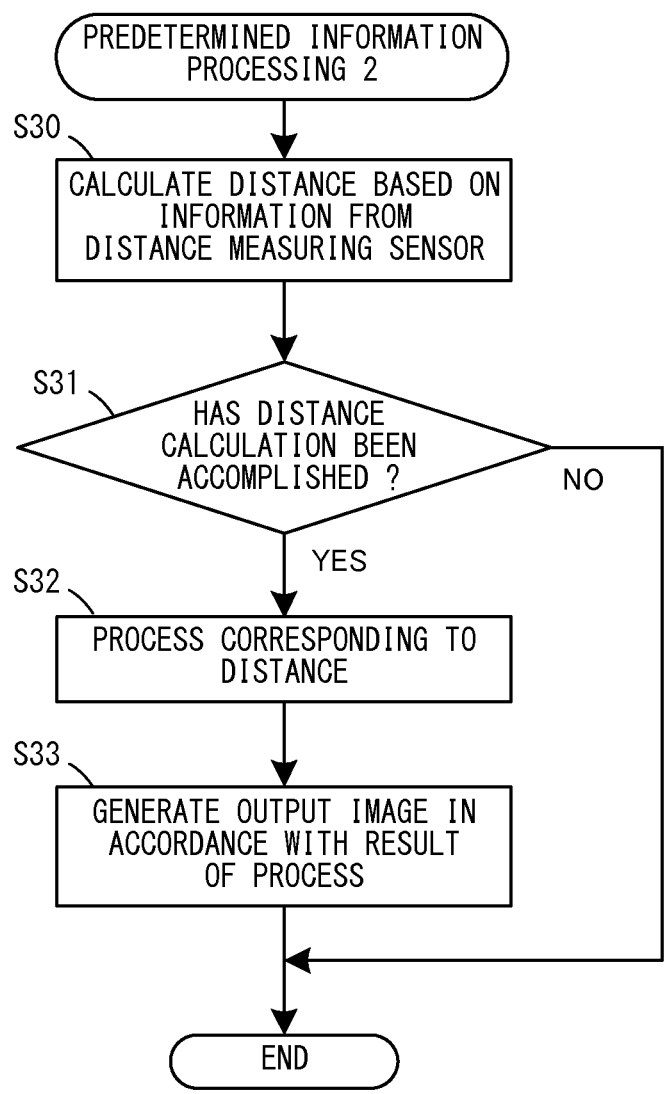

FIG. 20
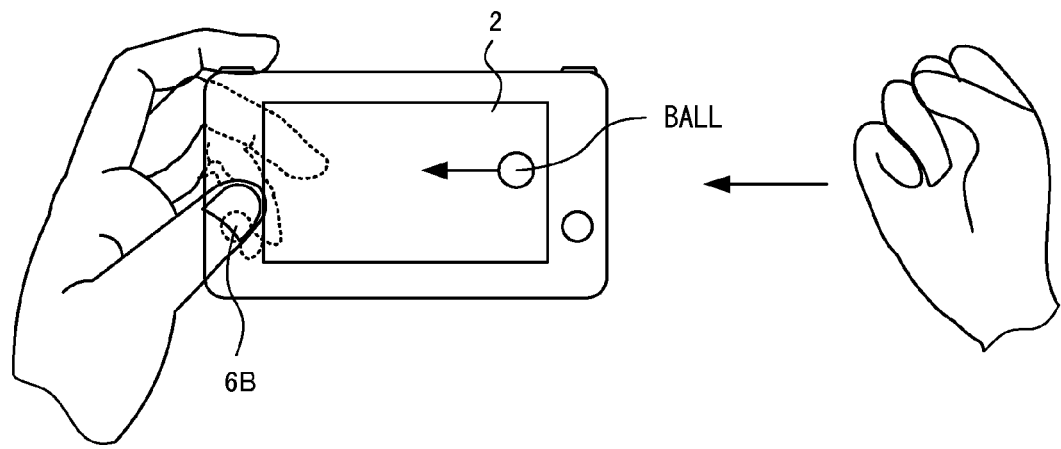
FIG. 21
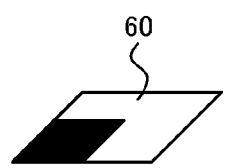
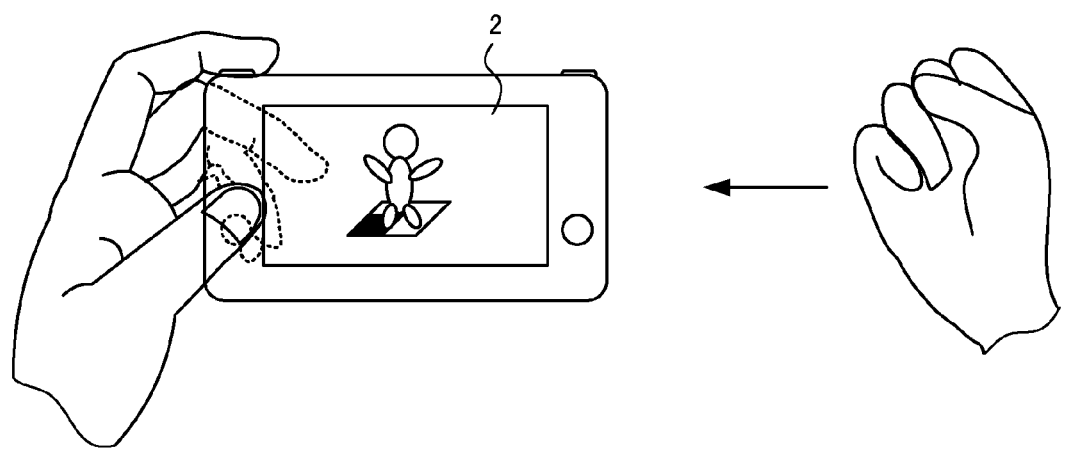

F I G. 26
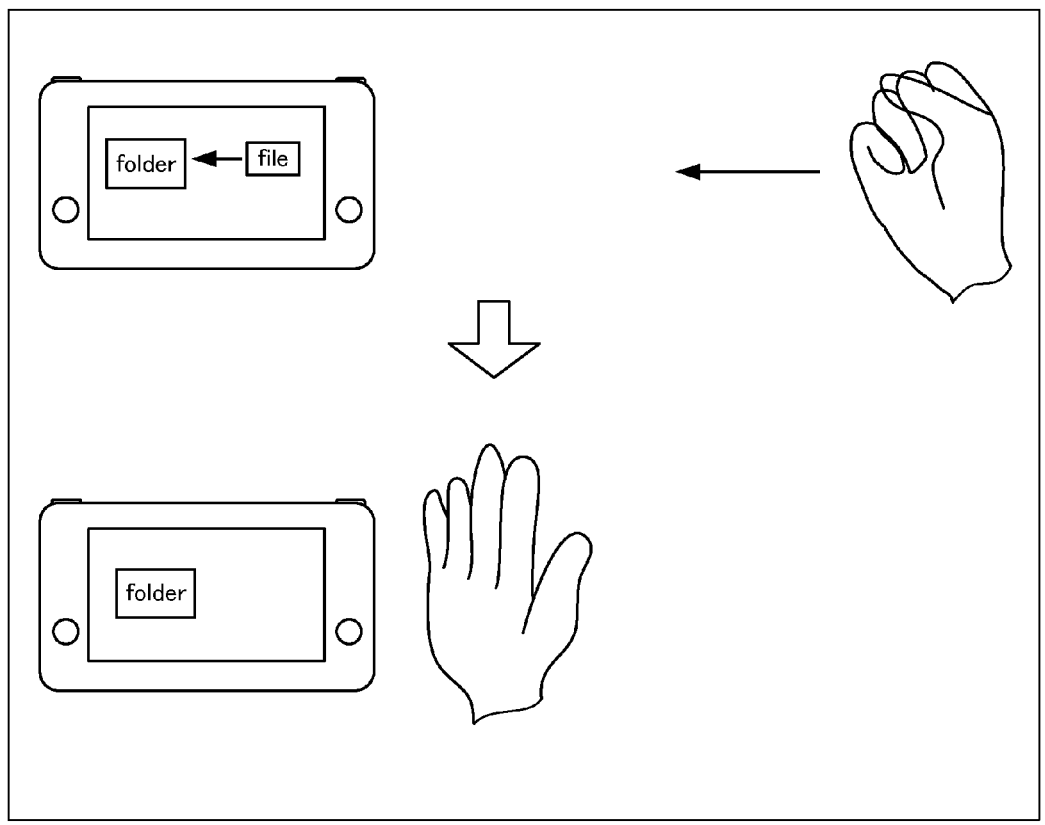

ELECTRONIC APPARATUS

CROSS REFERENCE TO RELATED APPLICATION

The disclosures of Japanese Patent Application Nos. 2014-182584, 2014-182585, 2014-182587, and 2014-182591, filed on Sep. 8, 2014, and 2015-23952, filed on Feb. 10, 2015, are incorporated herein by reference.

FIELD

The technique disclosed here relates to a hand-held electronic apparatus capable of performing predetermined information processing.

BACKGROUND AND SUMMARY

Hitherto, there is a portable game apparatus including a display and a camera provided behind the display. In such a conventional game apparatus, a captured image can be obtained through a shutter operation of a user, a characteristic portion of the obtained image can be analyzed, and a virtual character can be synthesized with the captured image on the basis of a result of the analysis and displayed on the display.

However, in the above conventional portable apparatus, the camera is provided behind the display, and thus there is room for improvement in that various inputs are performed by using the camera.

Therefore, an object of the exemplary embodiments is to provide an electronic apparatus capable of performing various inputs by using a camera.

In the exemplary embodiments, in order to attain the object described above, the following configuration examples are exemplified.

A hand-held electronic apparatus according to an embodiment includes a housing, a camera, an acquirer, a detector, and a display controller. The display is provided at a front surface of the housing. The camera is configured to capture an image in a side surface direction of the housing. The acquirer is configured to acquire an input image captured by the camera. The detector is configured to detect a specific object on the basis of the input image acquired by the acquirer. The display controller is configured to cause an output image corresponding to a result of detection by the detector to be displayed on the display.

Here, the "side surface" includes, in addition to side surfaces facing in a right-left direction when the display is viewed from the front surface, an upper side surface facing upward, and a bottom side surface facing downward. In addition, the "specific object" may be, for example, a part or the entirety of a human body, or may be any object.

According to the above, the electronic apparatus is able to capture, with the camera, an image of the specific object present in the side surface direction and is able to display, on the display, an image corresponding to a result of detection of the specific object.

In another configuration, the detector may detect a gesture made by a user.

According to the above, it is possible to detect a gesture made by the user, and it is possible to display an image corresponding to the gesture.

In another configuration, the camera may be provided at a side surface of the housing.

In another configuration, a held portion to be held by a user may be provided at least at a side opposite to a portion at an imaging direction side of the camera.

According to the above, the user is allowed to hold the electronic apparatus by holding the side opposite to the portion at the imaging direction side of the camera.

In another configuration, the detector may detect a gesture made with a hand of the user opposite to a hand of the user that holds the held portion.

According to the above, the user is allowed to hold the electronic apparatus with one hand and make a gesture with the other hand.

In another configuration, an input section capable of being operated by the user at least with the hand holding the held portion may be provided to the held portion.

According to the above, the user is allowed to perform an input with respect to the input section while holding the held portion.

The input section may be operated with a finger capable of being moved when the held portion is held.

According to the above, for example, if the user can move their index finger when the held portion is held with their thumb, the user is allowed to operate the input section by using the index finger.

The input section may be at least one push button.

In another configuration, the housing may have a horizontally long shape, and the camera may be provided at a short side of the housing.

According to the above, since the camera is provided at the short side in the horizontally long electronic apparatus, it is possible to obtain an image in the lateral direction with the camera.

In another configuration, the electronic apparatus may further include a game processor configured to perform game processing on the basis of the result of the detection by the detector. The display controller causes an output image corresponding to a result of the game processing to be displayed on the display.

According to the above, it is possible to perform a game by using the electronic apparatus, and it is possible to perform the game on the basis of the result of the detection of the specific object.

In another configuration, the camera may be a camera capable of receiving infrared light.

According to the above, it is possible to detect the specific object on the basis of an image captured by the camera capable receiving infrared light. By using the camera capable of receiving infrared light, it is possible to reduce influence of the external environment as compared to a normal camera which captures an image of visible light, and it is possible to obtain an image suitable for detecting the specific object.

In another configuration, the electronic apparatus may further include a vibration controller configured to operate a vibrator for providing vibration to a user, in accordance with the result of the detection by the detector.

According to the above, it is possible to provide vibration to the user in accordance with a result of detection of the specific object, and it is possible to perform output for the result of the detection by means of vibration.

In another configuration, the detector may obtain position information of a specific object present in the side surface direction of the housing. The display controller causes the output image to be displayed on the display on the basis of the position information.

According to the above, it is possible to output an image on the basis of the position information of the specific object.

In another configuration, the detector may detect a gesture made by a user with the specific object, and may obtain position information of the specific object present in the side surface direction of the housing. In addition, the display controller may cause the output image to be displayed on the display on the basis of the position information and the gesture.

In another configuration, a touch panel may be provided on the display.

According to the above, it is possible to perform an input by using the touch panel.

In another configuration, the detector may detect a click operation as the gesture.

In another configuration, the detector may detect, as the gesture, an operation in which a finger makes a reciprocal movement a predetermined number of times.

In another configuration, the detector may detect a flick operation as the gesture.

In another configuration, the detector may detect, as the gesture, an operation of moving a finger from a certain direction toward a predetermined direction.

In another configuration, the detector may detect a pinch-in or pinch-out operation as the gesture.

In another configuration, the detector may detect, as the gesture, an operation of changing an interval between at least two fingers.

In another configuration, the detector may detect, as the gesture, an operation of moving a hand while changing a shape of the hand.

In another configuration, the electronic apparatus may further include a processor configured to perform a predetermined process in accordance with a gesture detected by the detector.

In another configuration, the electronic apparatus may further include a sound controller configured to output a sound in accordance with the result of the detection by the detector.

According to the above, it is possible to output a sound in addition to an image in accordance with the result of the detection.

According to the present embodiment, it is possible to display an image on the display in accordance with a result of detection of a specific object present in the side surface direction.

These and other objects, features, aspects and advantages of the exemplary embodiments will become more apparent from the following detailed description when taken in conjunction with the accompanying drawings.

BRIEF DESCRIPTION OF THE DRAWINGS

FIG. 13 is an example non-limiting diagram showing an example of a process using the distance measuring sensor 5;

FIG. 14 is an example non-limiting diagram showing a state where an image corresponding to a gesture input performed by the user is projected onto the hand of the user by using a projector 8;

FIG. 15 is an example non-limiting diagram showing a state where various gesture inputs are performed with a right hand with respect to the portable electronic apparatus 1 while the portable electronic apparatus 1 is held with a left hand;

FIG. 18 is an example non-limiting flowchart showing the predetermined information processing in step S12 in FIG. 16 in the case where a process based on detection information from the distance measuring sensor 5 is performed.

FIG. 20 is an example non-limiting diagram showing an application example of the process performed in the portable electronic apparatus 1;

FIG. 21 is an example non-limiting diagram showing an example of an image displayed on a display 2 when a process using an outer camera 9 and the infrared camera 4 and/or the distance measuring sensor 5 is performed;

FIG. 26 is an example non-limiting diagram showing an example of a process corresponding to a gesture operation in which the shape of a hand is changed while the hand is moved toward and away from the portable electronic apparatus 1;

DETAILED DESCRIPTION OF NON-LIMITING EXAMPLE EMBODIMENTS

Hereinafter, a portable electronic apparatus according to an exemplary embodiment will be described. The portable electronic apparatus is a hand-held information processing apparatus which can be held with hands and operated by a user, and may be, for example, a game apparatus, or may be any apparatus such as a mobile phone (smartphone, etc.), a tablet terminal, a camera, a watch-type terminal, or the like.

Figure 1:
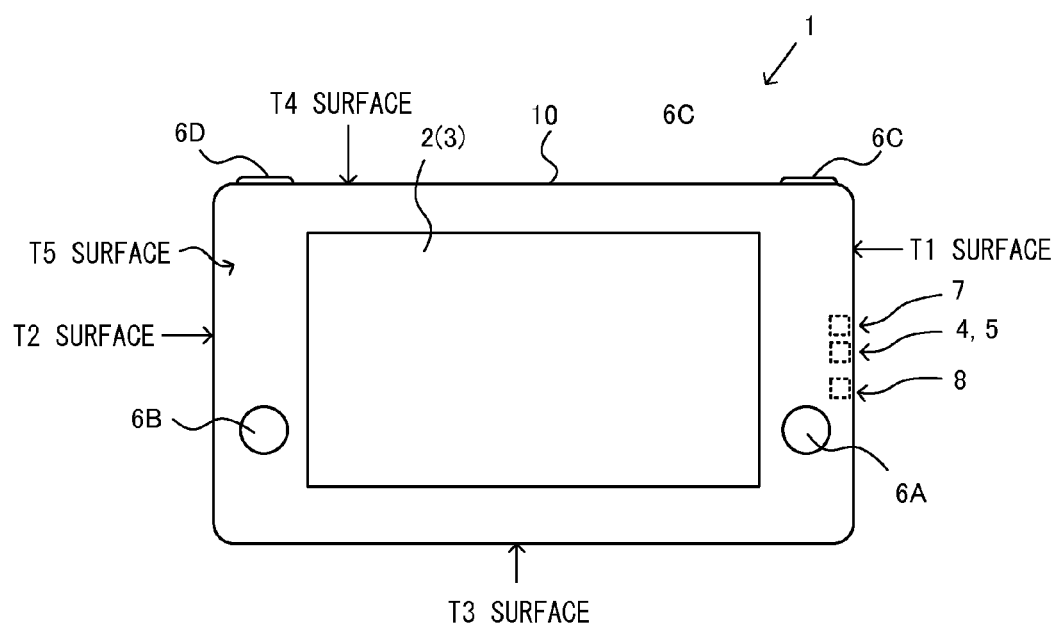
FIG. 1 is an example non-limiting front view of a portable electronic apparatus 1 according to an exemplary embodiment.
Figure 2:
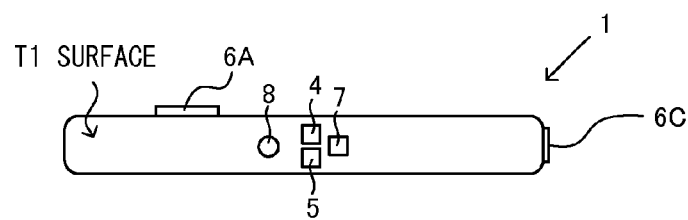
FIG. 2 is an example non-limiting right side view of the portable electronic apparatus 1.
Figure 3:
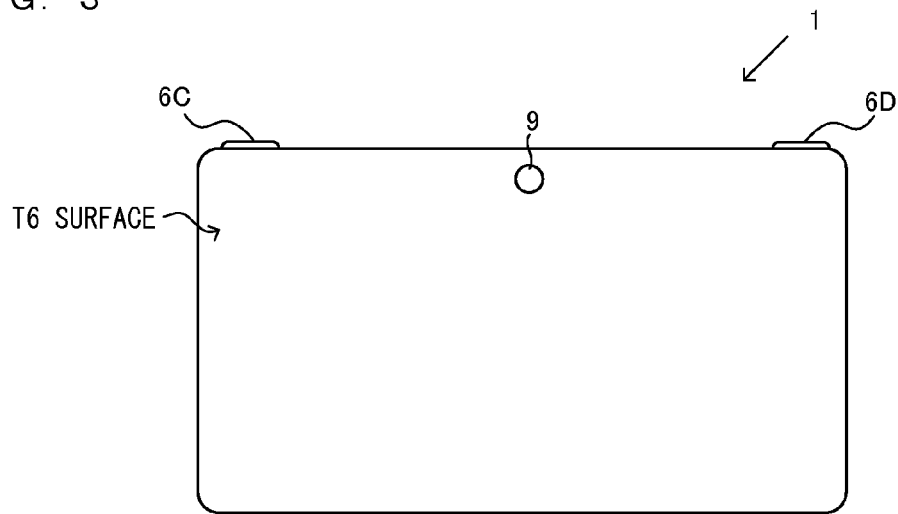
FIG. 3 is an example non-limiting rear view of the portable electronic apparatus 1.

FIG. 1 is a front view of a portable electronic apparatus 1 according to the present embodiment. FIG. 2 is a right side view of the portable electronic apparatus 1. FIG. 3 is a rear view of the portable electronic apparatus 1.

As shown in FIG. 1, the portable electronic apparatus 1 includes a display 2, a touch panel 3, an infrared camera 4, a distance measuring sensor 5, an input button 6 (6A to 6D), an irradiation section 7, and a projector 8, and these components are housed in a housing 10. The housing 10 (the portable electronic apparatus 1) has a plate-like shape and has a size small enough to be held with one hand or both hands of the user.

As the display 2, for example, a liquid crystal display device, an organic EL display device, or the like is used. In addition, any display device may be used. The screen of the display 2 is provided so as to be exposed on a front surface (T5 surface) of the housing 10. The touch panel 3 is provided on the screen of the display 2 and detects a position, on the screen, which is touched by the user. As the touch panel 3, one capable of detecting a single point or one capable of detecting multiple points is used, and any touch panel such as an electrostatic capacitance type, a resistive film type, or the like may be used.

The input buttons 6A to 6D accept an input (pressing) performed by the user. Each of the input buttons 6A to 6D is provided at a position which a finger of the user reaches when the user holds both ends of the portable electronic apparatus 1. Specifically, each of the input buttons 6A and 6C is located at a position which a finger of the right hand of the user reaches when the user holds the portable electronic apparatus 1 with their right hand, the input button 6A is provided at a position which the thumb of the right hand reaches, and the input button 6C is provided at a position which the index finger or the middle finger of the right hand reaches. In addition, each of the input buttons 6B and 6D is located at a position which a finger of the left hand of the user reaches when the user holds the portable electronic apparatus 1 with their left hand, the input button 6B is located at a position which the thumb of the left hand reaches, and the input button 6D is located at a position which the index finger or the middle finger of the left hand reaches. As shown in FIG. 1, the input buttons 6A and 6B are provided on the front surface (T5 surface) of the housing 10, and the input buttons 6C and 6D are provided on an upper side surface (T4 surface) of the housing 10. As an input section which accepts an input performed by the user, a cross key, an analog stick, or the like for a direction input may be provided in addition to the input buttons 6A to 6D.

The infrared camera 4 includes a lens and a sensor which senses light (infrared light, specifically, near-infrared light). The sensor of the infrared camera 4 is an image sensor in which elements that sense infrared light are arranged in rows and columns, and each element of the image sensor receives infrared light and converts the infrared light into an electric signal, thereby outputting a two-dimensional infrared image.

Light (e.g., infrared light) emitted from a light source provided in the distance measuring sensor 5 is reflected on an object. The distance measuring sensor 5 measures the distance to the object by its light receiving element receiving the reflected light. As the distance measuring sensor 5, any type of sensor such as a triangulation type sensor or a TOF (Time Of Flight) type sensor may be used. As the light source of the distance measuring sensor 5, an LED, a laser diode, or the like which emits infrared light in a specific direction is used.

The irradiation section 7 emits infrared light at a predetermined time interval (e.g., a 1/60 sec interval). The irradiation section 7 emits infrared light in synchronization with timing at which the infrared camera 4 captures an image. The irradiation section 7 emits infrared light to a predetermined range in a right side surface direction of the portable electronic apparatus 1. The infrared light emitted by the irradiation section 7 is reflected on an object and, the reflected infrared light is received by the infrared camera 4, whereby an image of the infrared light is obtained. The irradiation section 7 may be used for capturing an infrared image by the infrared camera 4 and measuring a distance by the distance measuring sensor 5. That is, using the infrared light from the irradiation section 7, an image may be captured by the infrared camera 4 and also a distance may be measured by the distance measuring sensor 5.

The projector 8 includes a light source which emits visible light, and projects a character, an image, or the like onto a projection surface (a screen, a hand of the user, etc.) by using light from the light source.

The infrared camera 4, the distance measuring sensor 5, the irradiation section 7, and the projector 8 are provided at a side surface (e.g., a right side surface: T1 surface) of the housing 10. Specifically, the imaging direction (optical axis) of the infrared camera 4 is directed in a direction perpendicular to the right side surface. The detection direction of the distance measuring sensor 5 and a direction in which the projector 8 emits light are also similarly directions perpendicular to the right side surface. That is, when the user holds the portable electronic apparatus 1 with their left hand, the infrared camera 4 captures an image of a space in the right side surface direction of the portable electronic apparatus 1, and the distance measuring sensor 5 measures the distance to an object present in the space in the right side surface direction of the portable electronic apparatus 1. In addition, the projector 8 projects an image or the like by emitting visible light in the same direction as those of the infrared camera 4 and the distance measuring sensor 5.

An outer camera 9 is provided at a back surface (T6 surface) of the portable electronic apparatus 1 (FIG. 3). The outer camera 9 is typically capable of capturing an image in a direction perpendicular to the imaging direction of the infrared camera 4, that is, in a direction perpendicular to the back surface. The outer camera 9 includes a lens and an image sensor which senses visible light. The outer camera 9 captures an image of a space in a back surface direction as a color image (RGB image). A camera may be provided at the front surface in addition to the outer camera 9 at the back surface. The outer camera 9 at the back surface may not be provided, and a camera may be provided at the front surface (the surface at which the screen of the display 2 is provided).

Figure 4:
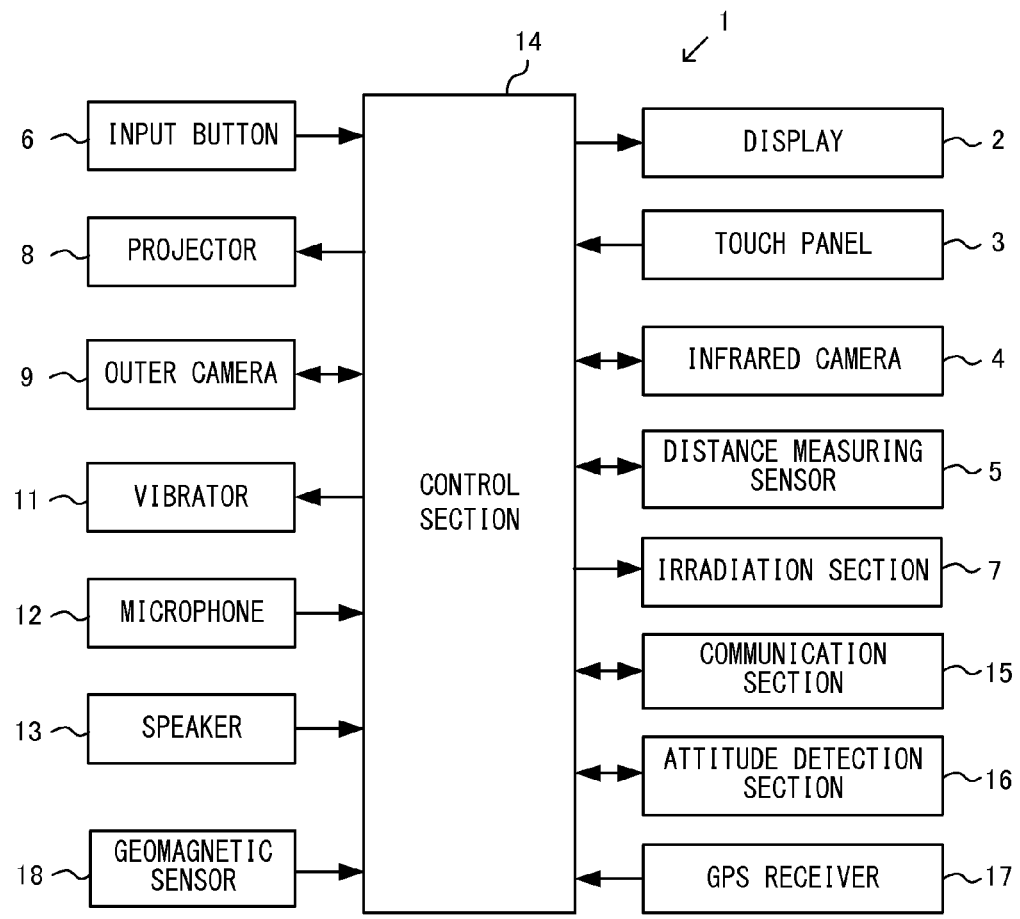
FIG. 4 is an example non-limiting block diagram showing an example of the internal configuration of the portable electronic apparatus 1.

FIG. 4 is a block diagram showing an example of the internal configuration of the portable electronic apparatus 1. As shown in FIG. 4, in addition to each section described above, the portable electronic apparatus 1 includes a vibrator 11, a microphone 12, a speaker 13, a control section 14, a communication section 15, an attitude detection section 16, a GPS receiver 17, and a geomagnetic sensor 18. In addition, the portable electronic apparatus 1 includes a battery which is not shown, and is supplied with power from the battery. These respective sections are housed in the housing 10.

The control section 14 is connected to the respective sections such as the display 2, the touch panel 3, the infrared camera 4, the distance measuring sensor 5, the input button 6, the irradiation section 7, the projector 8, the vibrator 11, the microphone 12, the speaker 13, the communication section 15, the attitude detection section 16, the GPS receiver 17, and the geomagnetic sensor 18, and controls the respective sections.

Specifically, the control section 14 includes a CPU, a memory, and the like, and performs a predetermined process on the basis of a predetermined program (e.g., application programs for performing game processing, image processing, and various calculations) stored in a storage unit (e.g., a nonvolatile memory, a hard disk, etc.) which is provided in the portable electronic apparatus 1 and not shown. For example, the control section 14 acquires an image from the infrared camera 4 and analyzes the image; calculates the distance to an object on the basis of a signal from the distance measuring sensor 5; and performs a process corresponding to an input signal from the touch panel 3 or the input button 6. The control section 14 generates an image based on a result of a predetermined process, and outputs the image to the display 2. A program for performing the predetermined process may be downloaded from the outside via the communication section 15.

The vibrator 11 operates on the basis of an instruction from the control section 14, to vibrate the entire portable electronic apparatus 1. The vibrator 11 is provided at a predetermined position (e.g., at a center portion within the housing 10 or a position shifted left or right therefrom) from which vibration is easily transmitted to the hands of the user.

The microphone 12 and the speaker 13 are used for inputting and outputting sound. The communication section 15 is used for performing communication with another apparatus by a predetermined communication method (e.g., a wireless LAN, etc.). The attitude detection section 16 is, for example, an acceleration sensor or an angular velocity sensor, and detects the attitude of the portable electronic apparatus 1.

The GPS receiver 17 receives a signal from a GPS (Global Positioning System) satellite, and the portable electronic apparatus 1 can calculate the position of the portable electronic apparatus 1 on the basis of the received signal. For example, when a predetermined operation (e.g., a gesture input using the infrared camera 4 described later, a button input, or a motion of shaking the portable electronic apparatus 1) is performed at a specific position, the portable electronic apparatus 1 may display an object associated with the specific position. For example, in the case where a game is played with the portable electronic apparatus 1, when the portable electronic apparatus 1 is present at a specific position, an object associated with the specific position may be caused to appear in the game.

The geomagnetic sensor 18 is a sensor capable of detecting the direction and the magnitude of magnetism. For example, the portable electronic apparatus 1 determines whether the portable electronic apparatus 1 is directed in a specific direction, on the basis of a detection result of the geomagnetic sensor 18. When a predetermined operation (the above-described gesture input, etc.) is performed in the specific direction, the portable electronic apparatus 1 may display an object. For example, when a game is played with the portable electronic apparatus 1, an object corresponding to the specific direction may be caused to appear in the game. In addition, the portable electronic apparatus 1 may use a combination of GPS information obtained by using the GPS receiver 17 and direction information obtained by using the geomagnetic sensor. For example, when the portable electronic apparatus 1 is present at a specific position and directed in a specific direction, the portable electronic apparatus 1 may display an object corresponding to the specific position and the specific direction, or may cause the object to appear in a game.

Figure 5:
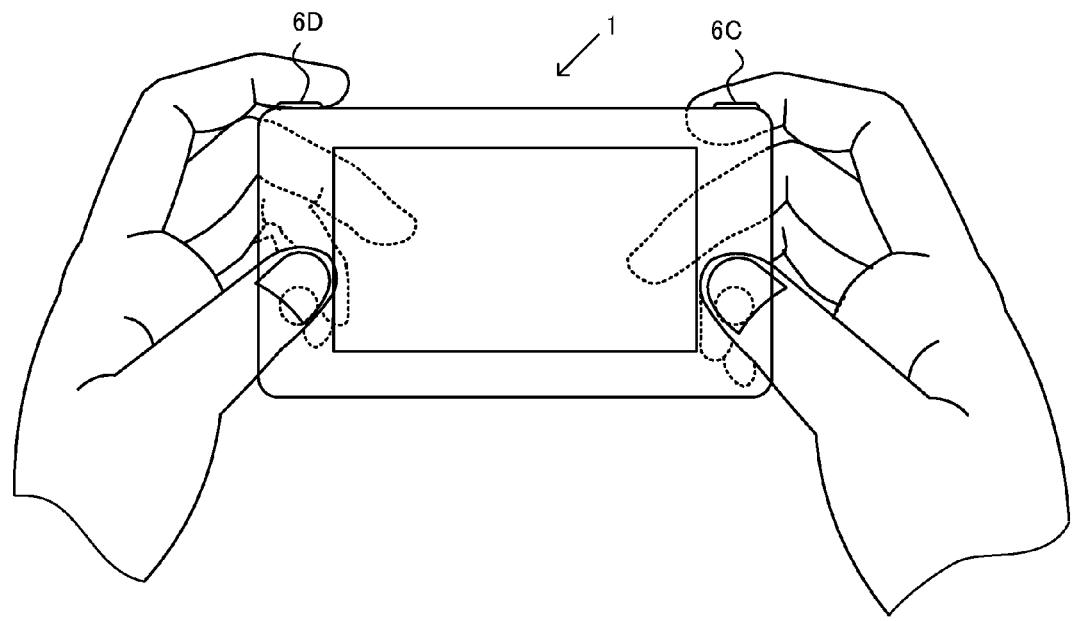
FIG. 5 is an example non-limiting diagram showing an example of a use state of the portable electronic apparatus 1 when a user holds the portable electronic apparatus 1 with both hands.

FIG. 5 is a diagram showing an example of a use state of the portable electronic apparatus 1 when the user holds the portable electronic apparatus 1 with both hands. As shown in FIG. 5, the user holds both left and right end portions of the portable electronic apparatus 1. When the user holds both left and right end portions, the user can press the input button 6B with the thumb of their left hand, and can press the input button 6A with the thumb of their right hand. In addition, when the user holds both left and right end portions, the user can move the index finger or the middle finger of their left hand to press the input button 6D with the index finger or the middle finger of their left hand, and can move the index finger or the middle finger of their right hand to press the input button 6C with the index finger or the middle finger of their right hand.

Next, an input with respect to the portable electronic apparatus 1 will be described. In the present embodiment, the user can perform a gesture input with respect to the portable electronic apparatus 1 by using their right hand in a state of holding the portable electronic apparatus 1 with their left hand.

Figure 6A:
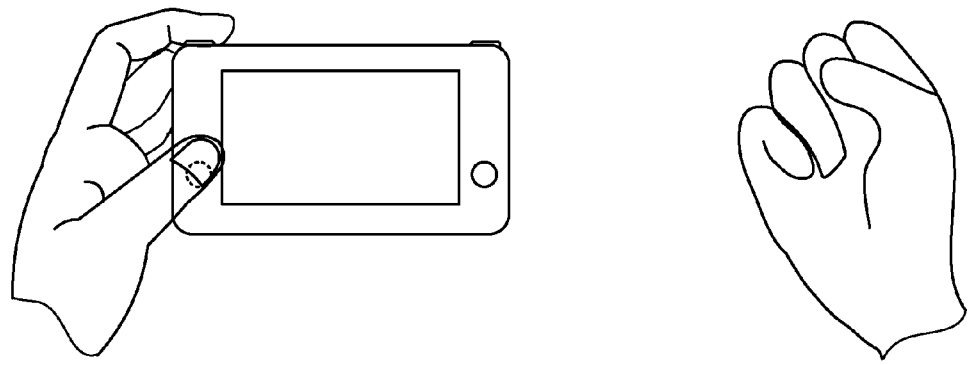
FIG. 6A is an example non-limiting diagram showing a state where the user performs a gesture input by using their right hand in a right side surface direction of the portable electronic apparatus 1.
Figure 6B:
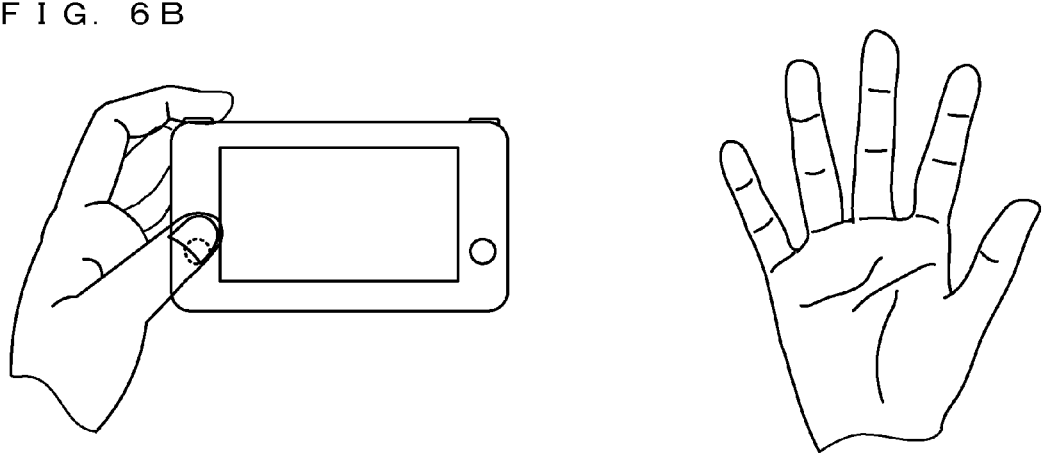
FIG. 6B is an example non-limiting diagram showing a state where the user performs a gesture input by using their right hand in the right side surface direction of the portable electronic apparatus 1.
Figure 7A:
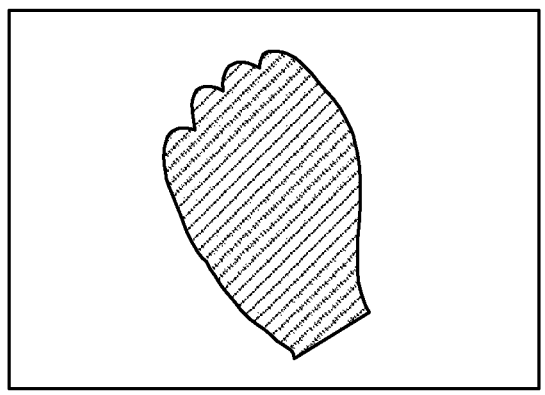
FIG. 7A is an example non-limiting diagram showing an example of an image captured by an infrared camera 4 when the gesture input shown in FIG. 6A is performed.
Figure 7B:
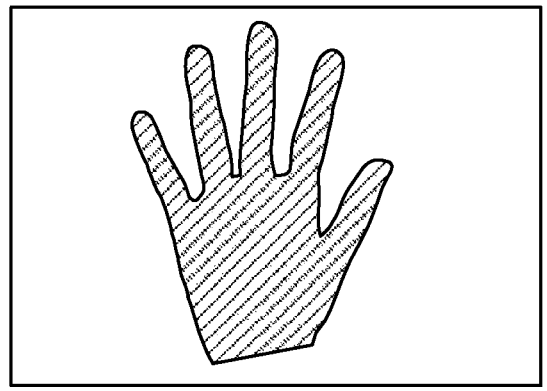
FIG. 7B is an example non-limiting diagram showing an example of an image captured by the infrared camera 4 when the gesture input shown in FIG. 6B is performed.

FIGS. 6A and 6B are each a diagram showing a state where the user performs a gesture input by using their right hand in the right side surface direction of the portable electronic apparatus 1. FIG. 7A is a diagram showing an example of an image captured by the infrared camera 4 when the gesture input shown in FIG. 6A is performed. FIG. 7B is a diagram showing an example of an image captured by the infrared camera 4 when the gesture input shown in FIG. 6B is performed.

As shown in FIGS. 6A and 6B, the user performs various gesture inputs by using their right hand at a position in the right side surface direction of the portable electronic apparatus 1. The portable electronic apparatus 1 captures an infrared image by the infrared camera 4 provided at the right side surface of the portable electronic apparatus 1, and analyzes the captured infrared image, thereby identifying a gesture input performed by the user.

Specifically, when the image shown in FIG. 7A or 7B is acquired from the infrared camera 4, the portable electronic apparatus 1 detects a specific object (specifically, a human hand) included in the acquired image, and identifies the type of a gesture made by the user, on the basis of the shape or the like of the specific object. For example, the portable electronic apparatus 1 determines whether an object having a predetermined shape is present in the acquired image, through pattern matching or the like. For example, when the image shown in FIG. 7A is acquired, the portable electronic apparatus 1 can recognize "rock" on the basis of the number of raised fingers. When the image shown in FIG. 7B is acquired, the portable electronic apparatus 1 can recognize "paper" on the basis of the number of raised fingers. Then, the portable electronic apparatus 1 performs a process corresponding to the type of the gesture as described later.

Here, examples of gestures to be identified include body gestures and hand gestures using a part or the entirety of the body such as the hands and the face of the user, and the portable electronic apparatus 1 may recognize, as a gesture input, a state where a hand or the like remains still, or may recognize, as a gesture input, a series of motions using a hand. In addition, the portable electronic apparatus 1 may recognize a gesture input performed in a state where the user holds an object. In this case, the portable electronic apparatus 1 may recognize, as a gesture input, a state where only the object held by the user remains still or is moved, or may recognize, as a gesture input, a state where both the hand of the user and the object remain still or are moved.

The portable electronic apparatus 1 of the present embodiment calculates the distance between the portable electronic apparatus 1 and an object by using the distance measuring sensor 5 as described later, and performs a process on the basis of the calculated distance. For example, on the basis of information from the distance measuring sensor 5, the portable electronic apparatus 1 detects whether an object is present in the right side surface direction of the portable electronic apparatus 1, or detects the distance between the portable electronic apparatus 1 and an object, thereby enabling a movement of the object in the right side surface direction to be detected. For example, when the distance detected by the distance measuring sensor 5 has changed within a predetermined time period, the portable electronic apparatus 1 can recognize that the user is swinging their hand right and left in the right side surface direction of the portable electronic apparatus 1. In addition, when an object has been detected and has not been detected by the distance measuring sensor 5 within a predetermined time period, the portable electronic apparatus 1 can recognize that the user is swinging their hand up and down. Then, the portable electronic apparatus 1 performs a predetermined process in accordance with the movement of the detected object, and displays a result of the process on the display 2.

As described above, in the present embodiment, by detecting a specific object in the right side surface direction of the portable electronic apparatus 1 using the infrared camera 4 and/or the distance measuring sensor 5, it is possible to identify various gesture inputs with respect to the portable electronic apparatus 1 and display, on the display 2, a result of a process corresponding to each input.

Figure 8:
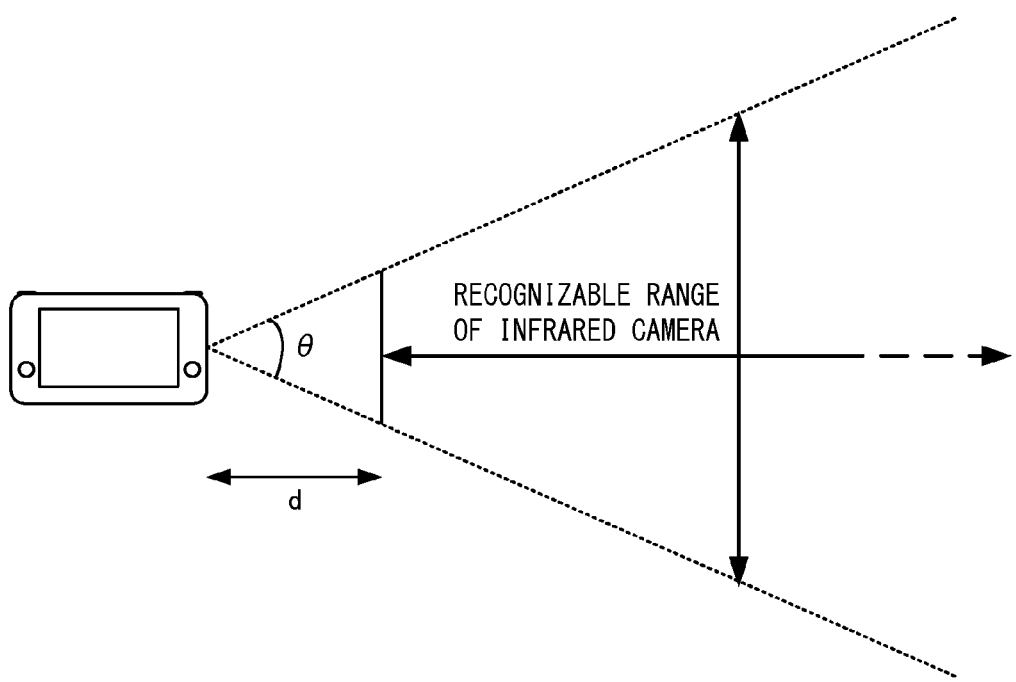
FIG. 8 is an example non-limiting diagram showing a recognizable range of the infrared camera 4.
Figure 9:
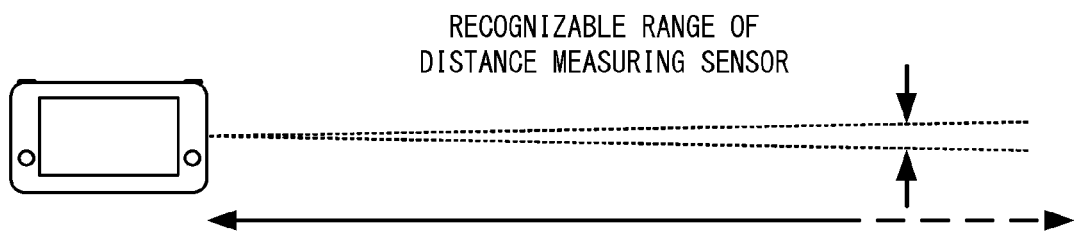
FIG. 9 is an example non-limiting diagram showing a recognizable range of a distance measuring sensor 5.

Here, each of the infrared camera 4 and the distance measuring sensor 5 has a recognizable range where an object can be recognized. FIG. 8 is a diagram showing the recognizable range of the infrared camera 4. FIG. 9 is a diagram showing the recognizable range of the distance measuring sensor 5.

As shown in FIG. 8, the infrared camera 4 has a predetermined angle of view θ. The infrared camera 4 captures an image in a range (e.g., a range of several tens to 180 degrees) included in the angle of view θ of the infrared camera 4, in the right side surface direction of the portable electronic apparatus 1, and this range is a recognizable range for a gesture input using the infrared camera 4. Here, when the distance between the portable electronic apparatus 1 and an object to be recognized is excessively short, an image of the entire object cannot be captured by using the infrared camera 4. Therefore, in the range included in the angle of view θ, an area away from the portable electronic apparatus 1 by a predetermined distance d is the recognizable range of the infrared camera 4. It should be noted that the distance d depends on the size of an object to be recognized.

As shown in FIG. 9, the distance measuring sensor 5 detects whether an object is present in the right side surface direction of the portable electronic apparatus 1, and measures the distance to the object. For example, the distance measuring sensor 5 is capable of detecting a distance of about several centimeters to 1 m. Unlike the infrared camera 4, the recognizable range of the distance measuring sensor 5 substantially linearly extends in the right side surface direction from the vicinity of the portable electronic apparatus 1. That is, the distance measuring sensor 5 detects an object present at a position located substantially on a straight line extending in the detection direction, and has very high directivity. On the other hand, the infrared camera 4 captures an image of an object present in a range which widens to some extent, and has low directivity.

Next, a process based on a gesture input detected by using the infrared camera 4 and the distance measuring sensor 5 will be described.

Figure 10A:
FIG. 10A is an example non-limiting diagram showing an example of a process based on a gesture input using the infrared camera 4.
Figure 10B:
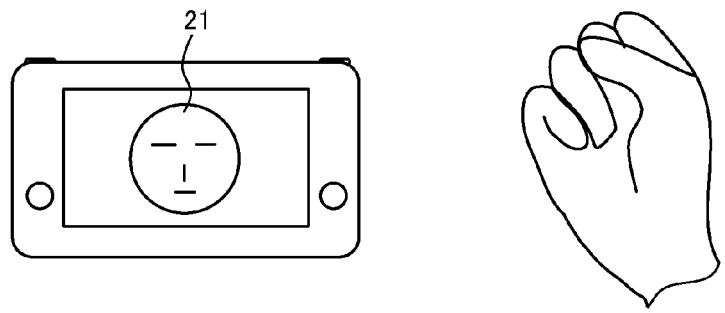
FIG. 10B is an example non-limiting diagram showing an example of a process based on a gesture input using the infrared camera 4.

FIGS. 10A to 10D are each a diagram showing an example of a process based on a gesture input using the infrared camera 4. As shown in FIG. 10A, when the user makes their right hand into "rock" at a predetermined position in the right side surface direction of the portable electronic apparatus 1 while holding the portable electronic apparatus 1 with their left hand, a character 21 is displayed on the display 2. As shown in FIG. 10B, when, from the state of FIG. 10A, the user moves their right hand toward the right side surface of the portable electronic apparatus 1 while their right hand is kept as "rock", the character 21 displayed on the display 2 is enlarged.

Figure 10C:
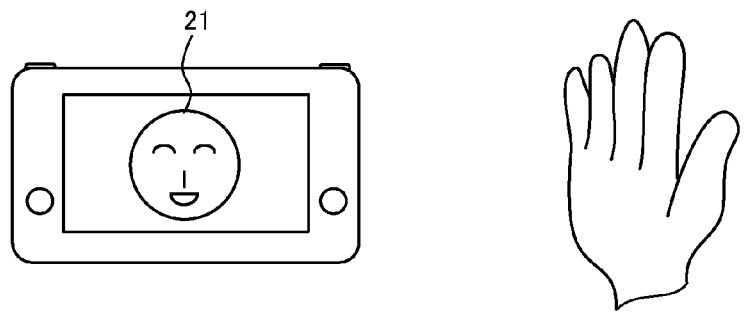
FIG. 10C is an example non-limiting diagram showing an example of a process based on a gesture input using the infrared camera 4.
Figure 10D:
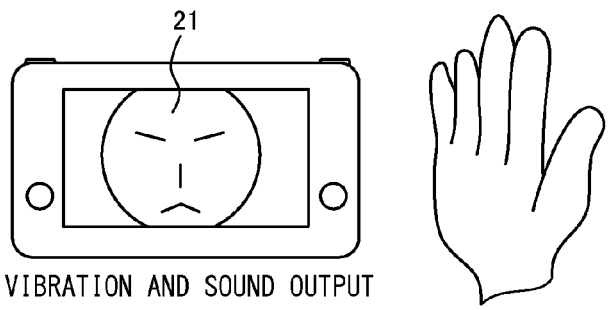
FIG. 10D is an example non-limiting diagram showing an example of a process based on a gesture input using the infrared camera 4.

Furthermore, when, from the state shown in FIG. 10B, the user makes their right hand into "paper", the facial expression of the character 21 on the display 2 changes (FIG. 10C). For example, as shown in FIG. 10C, the character 21 changes to have a smile expression. Moreover, as shown in FIG. 10D, when the user moves their right hand toward the portable electronic apparatus 1 while their right hand is kept as "paper", the displayed character 21 is further enlarged, and the facial expression of the character 21 changes. At that time, the vibrator 11 may operate to vibrate the portable electronic apparatus 1, and a sound may be outputted from the speaker 13.

Figure 11A:
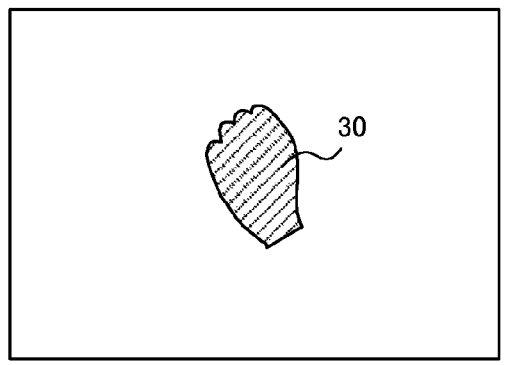
FIG. 11A is an example non-limiting diagram showing an example of an input image captured by the infrared camera 4 when the gesture input shown in FIG. 10A is performed.
Figure 11B:
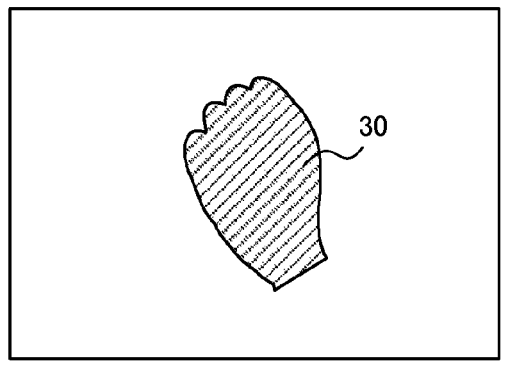
FIG. 11B is an example non-limiting diagram showing an example of an input image captured by the infrared camera 4 when the gesture input shown in FIG. 10B is performed.
Figure 11C:
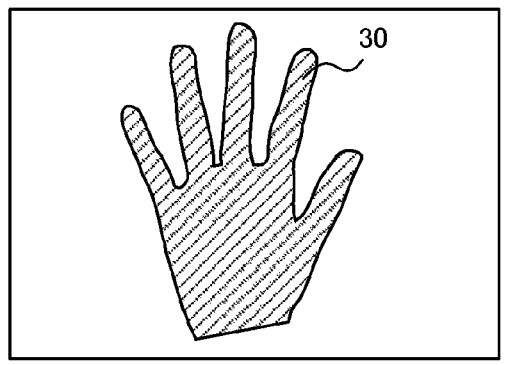
FIG. 11C is an example non-limiting diagram showing an example of an input image captured by the infrared camera 4 when the gesture input shown in FIG. 10C is performed.
Figure 11D:
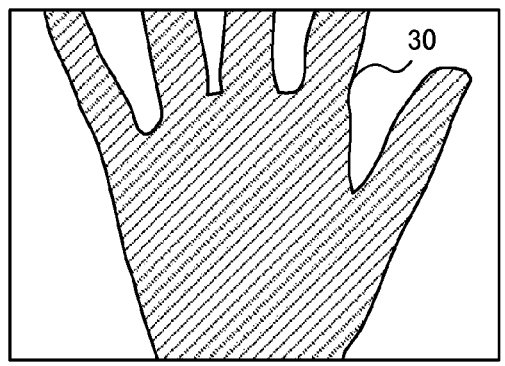
FIG. 11D is an example non-limiting diagram showing an example of an image captured by the infrared camera 4 when the gesture input shown in FIG. 10D is performed.

FIG. 11A is a diagram showing an example of an input image captured by the infrared camera 4 when the gesture input shown in FIG. 10A is performed. FIG. 11B is a diagram showing an example of an input image captured by the infrared camera 4 when the gesture input shown in FIG. 10B is performed. FIG. 11C is a diagram showing an example of an input image captured by the infrared camera 4 when the gesture input shown in FIG. 10C is performed. FIG. 11D is a diagram showing an example of an image captured by the infrared camera 4 when the gesture input shown in FIG. 10D is performed.

When the input image shown in FIG. 11A is acquired from the infrared camera 4, the portable electronic apparatus 1 detects an object 30 included in the acquired input image, and identifies the type of a gesture on the basis of the shape of the detected object 30. In the portable electronic apparatus 1, types of gestures and characters 21 to be displayed on the display 2 are stored so as to be associated with each other in advance. The portable electronic apparatus 1 displays an image of the character 21 corresponding to the identified type of the gesture, on the display 2 (FIG. 10A). Depending on the identified type of the gesture, the vibrator 11 may be operated to vibrate the portable electronic apparatus 1.

Next, when the input image shown in FIG. 11B is acquired, the portable electronic apparatus 1 detects the object 30 included in the acquired input image, and identifies the type of a gesture on the basis of the shape of the detected object 30. In FIG. 11B, the gesture is identified to be the same as in FIG. 11A, and thus an image of the character 21 displayed on the display 2 is the same image as in FIG. 10A (FIG. 10B). However, as the object (the right hand of the user) moves toward the portable electronic apparatus 1, the character 21 displayed on the display 2 is enlarged. Specifically, the portable electronic apparatus 1 sets a size of the image of the character 21 to be displayed on the display 2, by comparing the size of the object 30 included in the input image shown in FIG. 11A with the size of the object 30 included in the input image shown in FIG. 11B. In this manner, the portable electronic apparatus 1 determines a relative distance (relative position) between the portable electronic apparatus 1 and a specific object on the basis of the size of the specific object included in an image acquired from the infrared camera 4, and sets a size of the character 21 to be displayed on the display 2, in accordance with the relative distance. At that time, depending on the relative distance, the portable electronic apparatus 1 may be vibrated.

Next, when the input image shown in FIG. 11C is acquired from the infrared camera 4, the portable electronic apparatus 1 detects the object 30 included in the input image, and identifies the type of a gesture on the basis of the shape of the detected object 30. The portable electronic apparatus 1 identifies the gesture as "paper" on the basis of the shape of the object 30 included in the input image shown in FIG. 11C, and displays an image of the character 21 different from those in FIGS. 10A and 10B, on the display 2 as shown in FIG. 10C. A size of the character 21 to be displayed at that time may be set to be the same as the last-set size of the character 21, or may be set on the basis of the size of the object included in the input image.

Furthermore, when the input image shown in FIG. 11D is acquired from the infrared camera 4, the portable electronic apparatus 1 detects the object 30 included in the input image, and identifies the type of a gesture on the basis of the shape of the detected object 30. However, in FIG. 11D, a part of the object 30 lacks, and the portable electronic apparatus 1 cannot accurately identify the type of the gesture. Thus, as shown in FIG. 10D, the portable electronic apparatus 1 displays, on the display 2, the character 21 in a form indicating that the type of the gesture cannot be identified. In addition, in order to notify the user of the detection error, the portable electronic apparatus 1 is vibrated or a warning sound is outputted.

As shown in FIGS. 10A to 10D, the user performs a gesture input with respect to the portable electronic apparatus 1 by moving their right hand. However, even when the user fixes their right hand in place and moves the portable electronic apparatus 1 itself, it is determined that a gesture input has been performed. In order to avoid this, for example, the portable electronic apparatus 1 may detect a movement of the portable electronic apparatus 1 itself by using an acceleration sensor or an angular velocity sensor; and if the amount of the movement of the portable electronic apparatus 1 itself is equal to or greater than a predetermined threshold, the portable electronic apparatus 1 may determine that a gesture input has not been performed. For example, the portable electronic apparatus 1 may determine whether the portable electronic apparatus 1 itself is moving, by using a detection value from the acceleration sensor or the like; and if the portable electronic apparatus 1 determines that the portable electronic apparatus 1 itself is moving in the rightward direction in FIG. 10A, the portable electronic apparatus 1 may determine that a gesture input of moving the right hand leftward has not been determined. In addition, for example, when a movement of the right hand is detected on the basis of an image acquired from the infrared camera 4 and a movement of the portable electronic apparatus 1 itself is detected by using the acceleration sensor or the like, a process of cancelling the movement of the right hand detected on the basis of the image may be performed in accordance with the movement of the portable electronic apparatus 1 itself, and the character 21 may be displayed on the basis of a movement of the right hand calculated through this process. That is, predetermined information processing may be performed on the basis of the movement of the right hand based on the image acquired from the infrared camera 4 and the movement of the portable electronic apparatus 1 itself detected by using the acceleration sensor or the angular velocity sensor. In addition, the portable electronic apparatus 1 may determine whether the portable electronic apparatus 1 itself is moving, on the basis of an image from the outer camera 9; and if the portable electronic apparatus 1 itself is moving, the portable electronic apparatus 1 may determine that a gesture input has not been performed.

Figure 12A:
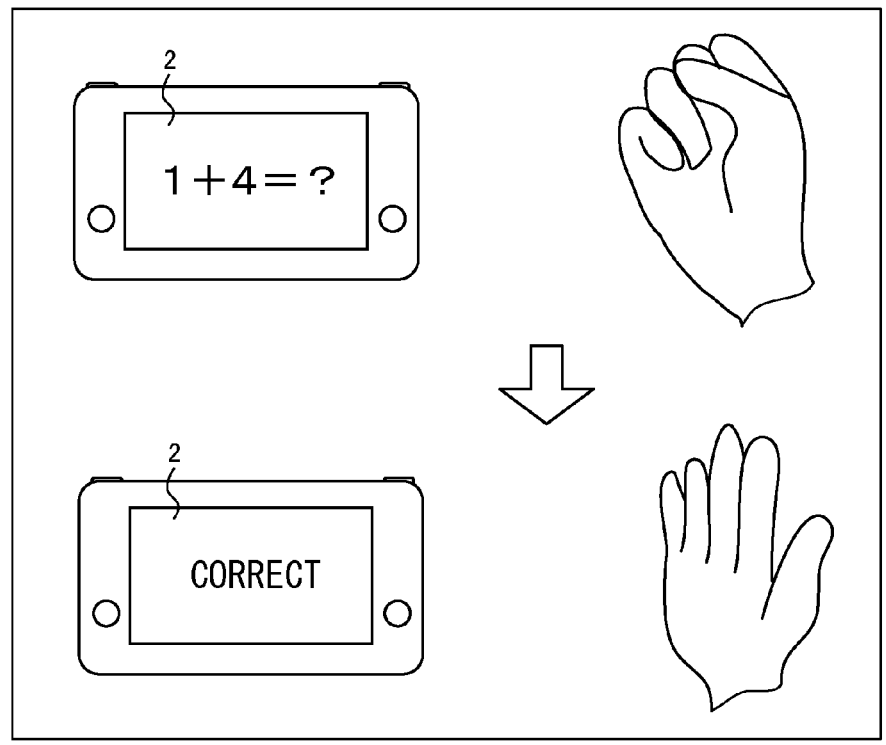
FIG. 12A is an example non-limiting diagram showing another example of a process based on a gesture input using the infrared camera 4.
Figure 12B:
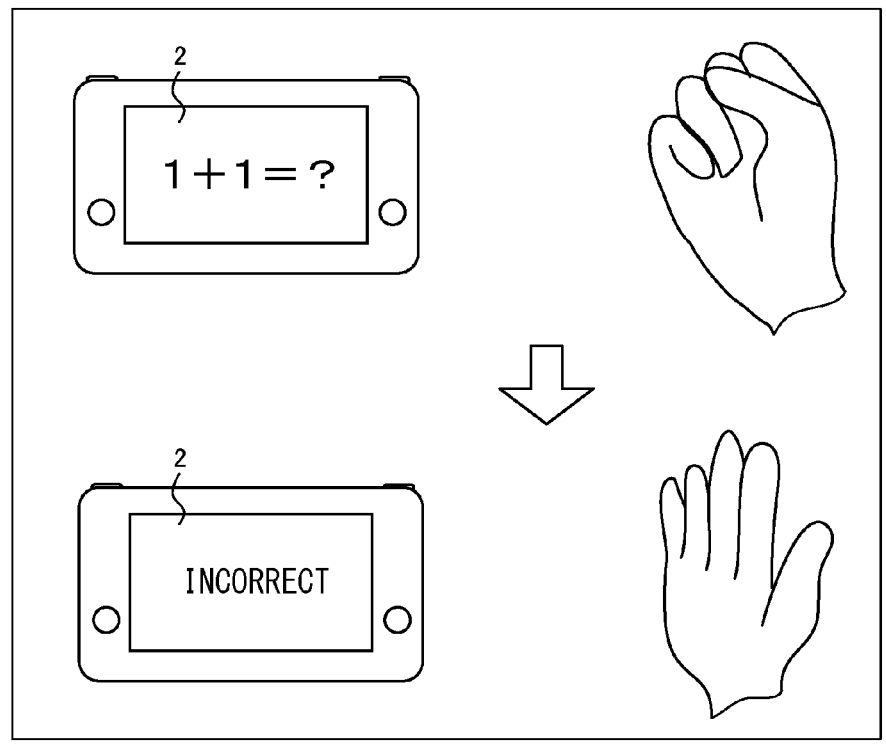
FIG. 12B is an example non-limiting diagram showing another example of a process based on a gesture input using the infrared camera 4.

FIGS. 12A and 12B are each a diagram showing another example of a process based on a gesture input using the infrared camera 4. In this example, a calculation question is displayed on the display 2. The user answers the question displayed on the display 2, by using their right hand. For example, when a character string "1+4=?" is displayed as shown in FIG. 12A, if the user performs, by using their right hand, a gesture input (a gesture of "paper") indicating "5" which is the correct answer of this question, a display indicating that the answer is correct is performed on the display 2. At that time, a sound indicating that the answer is correct may be outputted, or the vibrator 11 may be operated in a pattern indicating that the answer is correct, to vibrate the portable electronic apparatus 1.

When a character string "1+1=?" is displayed as shown in FIG. 12B, if the user performs, by using their right hand, a gesture input (an input of "5" by a gesture) different from the correct answer of this question, a display indicating that the answer is incorrect is performed on the display 2. At that time, a sound indicating that the answer is incorrect may be outputted, or the vibrator 11 may be operated in a pattern indicating that the answer is incorrect.

As described above, the portable electronic apparatus 1 identifies a gesture input performed by the user, on the basis of an input image from the infrared camera 4, and determines whether a question has been correctly answered. Then, the portable electronic apparatus 1 displays a result of the determination on the display 2. For example, the portable electronic apparatus 1 sequentially displays a plurality of questions within a predetermined time period, and the user answers the displayed questions through gestures using their right hand. Then, for example, a score is displayed on the display 2 on the basis of the number of questions correctly answered within the predetermined time period.

Next, an example of a process using the distance measuring sensor 5 will be described. FIG. 13 is a diagram showing the example of the process using the distance measuring sensor 5. As shown in FIG. 13, when the user puts their right hand at a predetermined position in the right side surface direction of the portable electronic apparatus 1 while holding the portable electronic apparatus 1 with their left hand, a snake character 22 appears from the right edge of the display 2. When the user moves their right hand toward the portable electronic apparatus 1, the snake character 22 extends leftward from the right edge of the display 2. Specifically, the portable electronic apparatus 1 calculates the distance between the portable electronic apparatus 1 and the right hand of the user on the basis of information from the distance measuring sensor 5, and sets a length of the snake character 22 in accordance with the calculated distance. Then, the portable electronic apparatus 1 displays the snake character 22 on the display 2. In addition, depending on the distance, the portable electronic apparatus 1 may operate the vibrator 11 to vibrate the portable electronic apparatus 1.

As described above, the portable electronic apparatus 1 calculates the distance between the portable electronic apparatus 1 and an object present in the right side surface direction of the portable electronic apparatus 1 by using the distance measuring sensor 5, and displays an image corresponding to the calculated distance, on the display 2. In the process using the distance measuring sensor 5, a predetermined process is performed on the basis of whether an object is present and/or the distance to the object. In addition, as described above, a movement of an object in the right side surface direction of the portable electronic apparatus 1 is detected on the basis of detection of the object or a change in the distance to the object within a predetermined time period, and a predetermined process is performed in accordance with the detection of the movement.

Next, an example of output using the projector 8 will be described. FIG. 14 is a diagram showing a state where an image corresponding to a gesture input performed by the user is projected onto the hand of the user by using the projector 8. As shown in the upper part of FIG. 14, for example, when the user makes their right hand into "paper" at a predetermined position in the right side surface direction of the portable electronic apparatus 1, the character 21 is projected onto the right hand of the user. Specifically, the portable electronic apparatus 1 analyzes an input image captured by the infrared camera 4, thereby identifying the type of the gesture input performed by the user. Next, the portable electronic apparatus 1 generates an image of the character 21 on the basis of the identified gesture input, and outputs the image of the character 21 by using the projector 8. At that time, the same (or a different) image may be outputted also to the display 2.

As shown in the lower part of FIG. 14, when the right hand is moved away from the portable electronic apparatus 1, for example, the image of the character 21 is projected onto the right hand of the user by using the projector 8 such that the size of the character 21 projected on the right hand does not changes. Specifically, the portable electronic apparatus 1 analyzes an image captured by the infrared camera 4 thereby to identify the gesture input performed by the user, and generates an image corresponding to a result of the identification. In addition, the portable electronic apparatus 1 sets a size of the image to be outputted, on the basis of the size of the hand included in the input image from the infrared camera 4. Moreover, the portable electronic apparatus 1 may set a size of the image to be outputted, on the basis of the distance measured by the distance measuring sensor 5 instead of or in addition to the input image from the infrared camera 4. Then, the portable electronic apparatus 1 projects the image having the set size by using the projector 8. At that time, the same (or a different) image may be outputted also to the display 2. When the user makes a gesture (e.g., "rock") different from that in FIG. 14 by using their right hand, an image different from that in FIG. 14 is projected onto the right hand. That is, a different image is projected in accordance with the type of the gesture.

For example, the portable electronic apparatus 1 sequentially displays, on the display 2, gestures which the user is caused to make. When the user makes the same gesture as the displayed gesture within a predetermined time period, it is determined as success; and when the user makes a gesture different from any displayed gesture, it is determined as failure. Then, the portable electronic apparatus 1 outputs an image from the projector 8 in accordance with a result of the determination, thereby projecting an image corresponding to the result of the determination, onto the hand of the user.

It should be noted the hand of the user may be tracked by capturing an image of the hand of the user with the infrared camera 4, and the projector 8 may be controlled such that an image is projected onto the hand of the user. The projector 8 is capable of projecting an image to a predetermined range. The portable electronic apparatus 1 acquires an image from the infrared camera 4 at a predetermined time interval, recognizes the position of the hand of the user on the basis of the image, and sets a position onto which an image is projected. For example, in a state where the image is projected on the hand of the user as shown in the lower part of FIG. 14, when the hand is moved upward, the portable electronic apparatus 1 detects the upward movement of the hand on the basis of the image from the infrared camera 4. On the basis of a result of the detection, the portable electronic apparatus 1 projects an image of the character by using the projector 8 onto the user's hand that has moved. As described above, by acquiring an image from the infrared camera 4 at a predetermined time interval, even when the hand of the user moves, the portable electronic apparatus 1 is able to project an image onto the hand of the user so as to follow the movement of the hand of the user. In addition, the portable electronic apparatus 1 is able to continuously project an image in accordance with a gesture continuously made by the user.

A range where a gesture input can be performed by the user may be notified the user of by emitting light in the right side surface direction of the portable electronic apparatus 1 using the projector 8. For example, when an image of the entire hand of the user can be captured by the infrared camera 4, blue light may be emitted; and when an image of only a part of the hand of the user can be captured by the infrared camera 4, red light may be emitted. That is, by emitting light from the projector 8 in a range which is the same as or similar to the imaging range (angle of view) of the infrared camera 4, the user can be caused to recognize the range where a gesture input can be performed, thereby guiding the user. The portable electronic apparatus 1 may include a light source (e.g., an LED, a halogen lamp, a fluorescent lamp, an EL lamp, etc.) which emits predetermined light instead of the projector 8 capable of projecting an image, and the range where a gesture input can be performed may be notified the user of by emitting light from the light source.

As described above, in the present embodiment, not only an input using the infrared camera 4 or the distance measuring sensor 5 but also output by light using the projector 8 are enabled to be performed from the side surface direction of the portable electronic apparatus 1.

As described above, in the present embodiment, the infrared camera 4 and the distance measuring sensor 5 are provided at the right side surface of the portable electronic apparatus 1, the user performs various gesture inputs with their right hand while holding the portable electronic apparatus 1 with their left hand, and a predetermined process corresponding to each gesture input is performed. Since the infrared camera 4 and the distance measuring sensor 5 are provided at the right side surface, while holding the portable electronic apparatus 1 with one hand and viewing the display 2, the user is allowed to perform a gesture input with the other hand without an uncomfortable feeling.

For example, in the case where the infrared camera 4 and the distance measuring sensor 5 for a gesture input are provided at the T5 surface (front surface) at which the screen of the display 2 is provided, when the user performs a gesture input, their hand overlaps the screen of the display 2, thereby decreasing the visibility of the display 2. In addition, in the case where the infrared camera 4 and the distance measuring sensor 5 for a gesture input are provided at the T6 surface (back surface) which is opposite to the screen of the display 2, the user performs a gesture input behind the screen, so that the user cannot see their right hand and has difficulty in performing a gesture input.

However, in the portable electronic apparatus 1 of the present embodiment, the infrared camera 4 and the distance measuring sensor 5 for a gesture input are provided at the side surface of the display 2. Thus, even when the user performs a gesture input with their right hand, the screen and the right hand do not overlap each other, so that the user can perform the gesture input without decreasing the visibility of the screen. In addition, since the infrared camera and the like are provided at the side surface of the display 2, while holding the portable electronic apparatus 1 with one hand, the user is allowed to perform a gesture input with the other hand with respect to the portable electronic apparatus 1, and is allowed to perform an input with respect to the portable electronic apparatus 1 such that the portable electronic apparatus 1 is sandwiched between both hands in the right-left direction, and confirm output (image display) corresponding to the input. Thus, it is possible to provide, to the user, a new feeling of operation and use of the portable electronic apparatus which feeling is not provided in the conventional art.

FIG. 15 is a diagram showing a state where the user performs various gesture inputs with their right hand with respect to the portable electronic apparatus 1 while holding the portable electronic apparatus 1 with their left hand. As shown in FIG. 15, the user can perform an input from the side surface direction with respect to the portable electronic apparatus 1 by moving their right hand toward or away from the portable electronic apparatus 1 in the right-left direction, moving their right hand up and down, rotating their right hand, or extending and bending any finger of the five fingers of the right hand. By performing an input from the side surface direction, the user is allowed to more strongly feel that the user performs the input with respect to the portable electronic apparatus 1.

The user performs a gesture input from the right hand direction while viewing the screen of the display 2, and is allowed to view an image displayed on the display 2 as a result of the gesture input. That is, at the same time when the user views the screen of the display 2, the right hand with which a gesture input is performed comes into the user's field of vision, and the user is allowed to simultaneously view an input using their right hand and output from the display 2. Thus, the user is allowed to more naturally perform a gesture input and confirm output corresponding to the gesture input.

In the portable electronic apparatus 1 of the present embodiment, the infrared camera 4 is used, a normal camera which captures an image (RGB image) of visible light is not used, and thus the portable electronic apparatus 1 has robustness. That is, in the case where a normal camera is used, depending on the brightness of the external environment (intensity of visible light), it may be impossible to obtain an input image suitable for image recognition due to an excessively large or small amount of light. In addition, when a human hand is recognized in the case where a normal camera is used, the hand is recognized on the basis of the shape of the hand and the skin color of the hand, but it may be impossible to recognize the human hand depending on the color of light in the external environment. That is, depending on the external environment, it may be impossible to obtain an image in which a specific object (e.g., the user's hand) is detectable. However, in the case where the infrared camera 4 is used, it is possible to obtain an input image which is not influenced by the external environment and is suitable for image recognition, by transmitting infrared light from the irradiation section 7 (infrared light that is emitted from the irradiation section 7 and reflected on an object) while blocking visible light with a filter. In particular, the amount of infrared light decreases in an indoor space in which sunlight is blocked, and a specific object is irradiated with the infrared light from the irradiation section 7, thereby enabling a clear image, which is not influenced by the external environment and includes the specific object, to be obtained. In addition, also in an outdoor space, for example, at night, the specific object is irradiated with the infrared light from the irradiation section 7, thereby enabling an image, which is required for image recognition, to be obtained.

(Description of Flowcharts)

Figure 16:
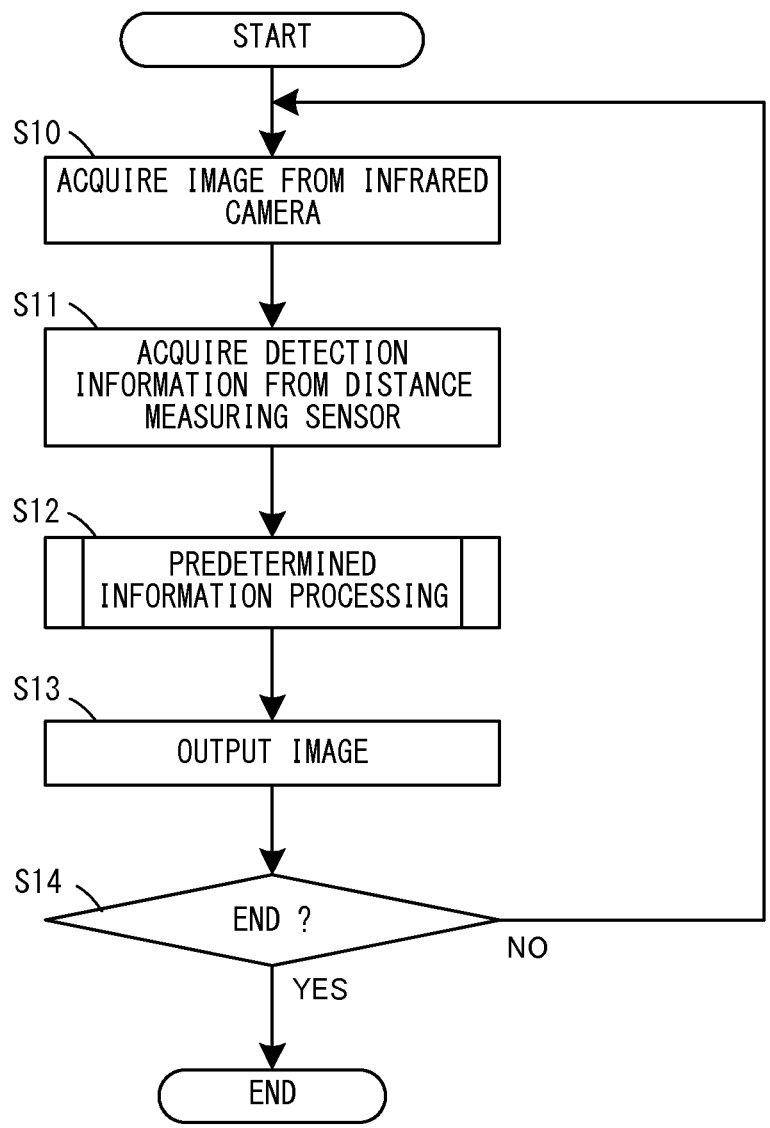
FIG. 16 is an example non-limiting flowchart showing an example of a process performed in the portable electronic apparatus 1.

Next, an example of a process performed in the portable electronic apparatus 1 will be described. FIG. 16 is a flowchart showing an example of the process performed in the portable electronic apparatus 1. The process shown in FIG. 16 is performed by the control section 14 executing a predetermined program. In addition, the process shown in FIG. 16 is repeatedly performed at a predetermined time interval (e.g., every 1/60 second).

As shown in FIG. 16, in step S10, the control section 14 acquires an input image from the infrared camera 4. Specifically, the control section 14 causes the irradiation section 7 to emit infrared light, and acquires an input image captured by the infrared camera 4. Next, the control section 14 acquires detection information from the distance measuring sensor 5 (step S11).

Next, the control section 14 performs predetermined information processing (step S12). Here, as the predetermined information processing, any of the following is conceivable: a process using the input image from the infrared camera 4; a process based on the detection information from the distance measuring sensor 5; and a process using both the infrared camera 4 and the distance measuring sensor 5. The predetermined information processing in step S12 will be described later with reference to FIGS. 17 to 19.

After the processing in step S12, the control section 14 outputs an image based on a result of the predetermined information processing in step S12 to the display 2 and/or the projector 8 (step S13). Then, the control section 14 determines whether to end the process shown in FIG. 16 (step S14). If the control section 14 determines not to end the process, the control section 14 performs the process in step S10 again. If the control section 14 determines to end the process, the control section 14 ends the process shown in FIG. 16.

Next, the predetermined information processing in step S12 in FIG. 16 will be described. As the predetermined information processing, as described above, there are the process using the image from the infrared camera 4, the process based on the detection information from the distance measuring sensor 5, and the process using both the infrared camera 4 and the distance measuring sensor 5. Which of these three processes is to be performed is determined on the basis of the type of an application. Hereinafter, the respective processes will be described with reference to FIGS. 17 to 19.

(Predetermined Information Processing 1 Using Infrared Camera 4)

Figure 17:
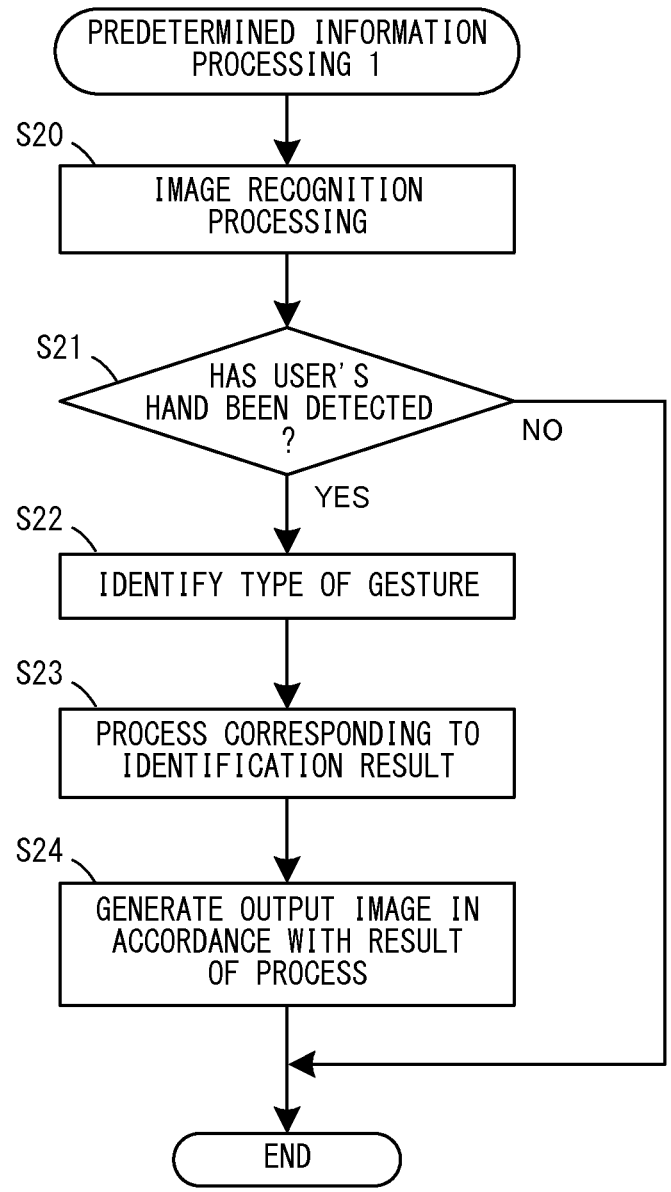
FIG. 17 is an example non-limiting flowchart showing predetermined information processing in step S12 in FIG. 16 in the case where an input image from the infrared camera 4 is used.

FIG. 17 is a flowchart showing the predetermined information processing in step S12 in FIG. 16 in the case where the input image from the infrared camera 4 is used. The processing shown in FIG. 17 is, for example, a process for executing the application shown in FIG. 10 or 12.

As shown in FIG. 17, the control section 14 performs image recognition processing on the input image acquired from the infrared camera 4 in step S10 (step S20). Specifically, the control section 14 detects a user's hand (a specific object) included in the input image from the infrared camera 4, by using a predetermined image recognition technique.

Next, the control section 14 determines whether a user's hand has been detected in the image recognition processing (step S21). If a user's hand is detected (step S21: YES), the control section 14 identifies the type of a gesture (step S22). Specifically, on the basis of the shape of the detected user's hand, the control section 14 identifies the type of the gesture corresponding to the shape. Subsequently, the control section 14 performs a process corresponding to a result of the identification of the gesture (step S23). For example, the control section 14 selects an image corresponding to the identified type of the gesture, or performs a determination as to right or wrong in a predetermined game (as to whether the input is correct) in accordance with the identified type of the gesture.

The content of the process in step S23 is different depending on the type of the program (application) to be executed. For example, any game program may be executed as the program. In addition, a program for performing an operation (e.g., enlarging the screen, reducing the screen, scrolling the screen, activating or ending a predetermined application, setting the portable electronic apparatus 1, etc.) with respect to the portable electronic apparatus 1, may be executed. For example, when a program corresponding to the process shown in FIG. 10 is executed, the control section 14 sets a type of an image to be outputted and sets a size of the image, on the basis of the identified type of the gesture and the size of the user's hand included in the input image. In addition, for example, when a program corresponding to the process shown in FIG. 12 is executed, the control section 14 determines whether an answer made by the user is correct (a correct gesture has been performed).

Next, the control section 14 generates an output image in accordance with a result of the process in step S23 (step S24). The output image generated here is outputted to the display 2 and/or the projector 8 in step S13.

On the other hand, if the control section 14 determines in step S21 that no specific object has been detected (step S21: NO), the control section 14 ends the processing shown in FIG. 17.

(Predetermined Information Processing 2 Using Distance Measuring Sensor 5)

FIG. 18 is a flowchart showing the predetermined information processing in step S12 in FIG. 16 in the case where a process based on the detection information from the distance measuring sensor 5 is performed. The processing shown in FIG. 18 is, for example, a process for executing the application shown in FIG. 13.

As shown in FIG. 18, the control section 14 calculates the distance between an object and the portable electronic apparatus 1 on the basis of the detection information acquired from the distance measuring sensor 5 in step S11 (step S30). Next, the control section 14 determines whether the calculation of the distance has been accomplished (step S31). If the calculation of the distance has not been accomplished (step S31: NO), that is, if no object has been detected, the control section 14 ends the processing shown in FIG. 18.

If the calculation of the distance has been accomplished (step S31: YES), the control section 14 performs a process corresponding to the distance (step S32).

The content of the process in step S32 is different depending on the type of the program (application) to be executed. For example, any game program may be executed as the program. In addition, a program for performing an operation with respect to the portable electronic apparatus 1 may be executed. For example, when a program corresponding to the process shown in FIG. 13 is executed, the control section 14 sets a length of the snake character 22 on the basis of the calculated distance. In step S32, movement of the object may be detected on the basis of distances calculated in a predetermined past period. That is, when no object has been detected or the calculated distance has changed in the predetermined past period, the control section 14 detects movement of the object on the basis of a pattern of the change and performs a process corresponding to the detected movement.

Then, the control section 14 generates an output image in accordance with a result of the process in step S32 (step S33). The output image generated here is outputted to the display 2 and/or the projector 8 in step S13.

(Predetermined Information Processing 3 Using Infrared Camera 4 and Distance Measuring Sensor 5)

Figure 19:
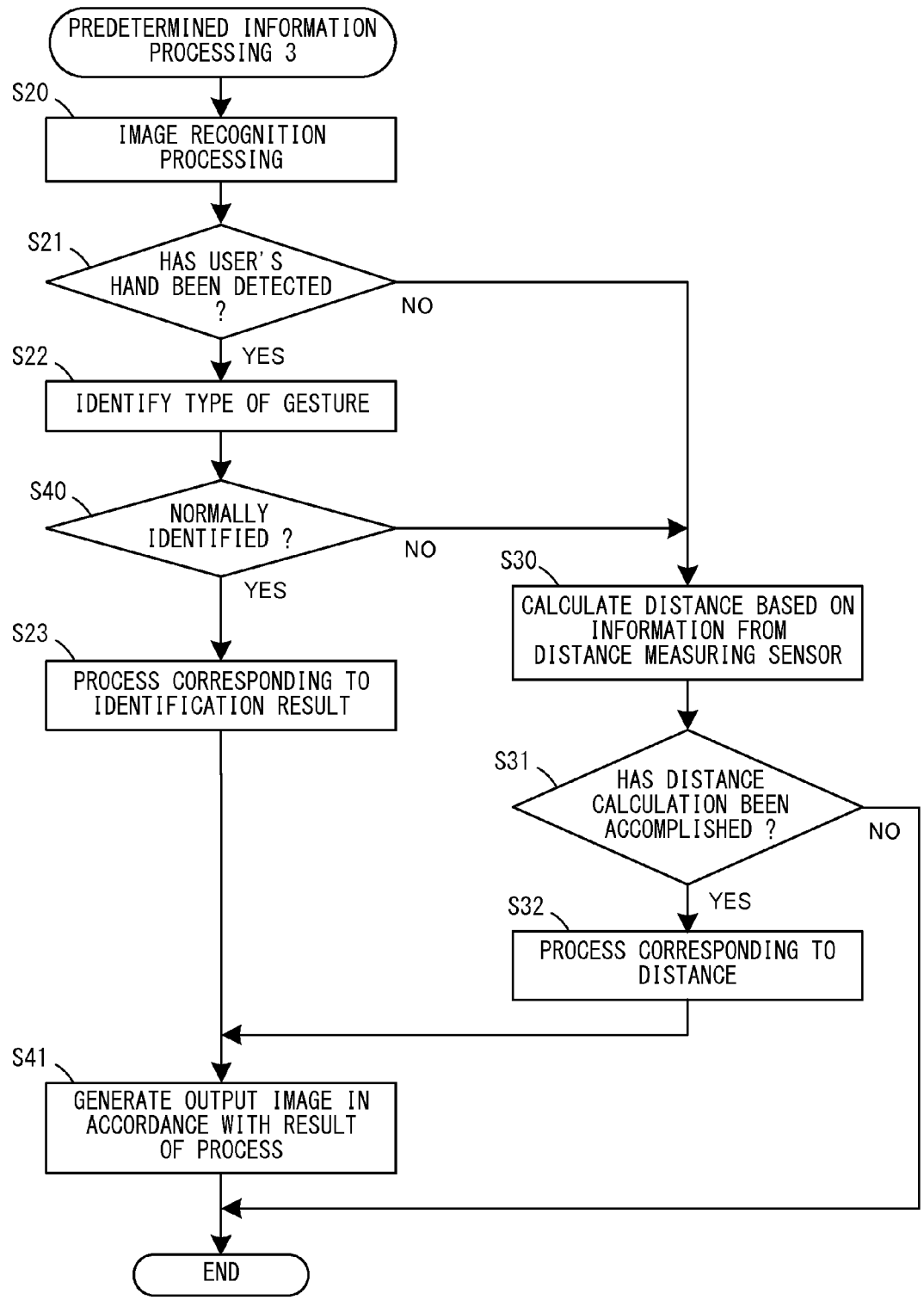
FIG. 19 is an example non-limiting flowchart showing the predetermined information processing in step S12 in FIG. 16 in the case where a process using the infrared camera 4 and the distance measuring sensor 5 is performed.

Next, the predetermined information processing using both the infrared camera 4 and the distance measuring sensor 5 will be described. FIG. 19 is a flowchart showing the predetermined information processing in step S12 in FIG. 16 when the process using the infrared camera 4 and the distance measuring sensor 5 is performed. In FIG. 19, the same processes as those in FIGS. 17 and 18 are designated by the same reference characters, and the description thereof is omitted.

As shown in FIG. 19, subsequent to the image recognition processing (step S20), if a user's hand (specific object) has been detected in the input image from the infrared camera 4 (step S21: YES), the control section 14 identifies the type of a gesture (step S22). Subsequently, the control section 14 determines whether the type of the gesture has been normally identified (step S40). For example, even if the specific object has been detected in an image included in the image from the infrared camera 4 as shown in FIG. 11D, when a part of the specific object lacks, the control section 14 determines "NO" in step S40.

If the gesture has been normally identified (step S40: YES), the control section 14 performs a process corresponding to a result of the identification (step S23).

On the other hand, if the gesture has not been normally identified (step S40: NO), or if no user's hand has been detected (step S21: NO), the control section 14 calculates a distance on the basis of the detection information from the distance measuring sensor 5 (step S30). Then, the control section 14 determines whether the calculation of the distance has been accomplished similarly to FIG. 18 (step S31). If the calculation of the distance has been accomplished (step S31: YES), the control section 14 performs a process corresponding to the distance (step S32).

If the process in step S23 is performed, or if the process in step S32 is performed, the control section 14 generates an output image in accordance with a result of the process in step S23 or the process in step S32 (step S41). That is, if the process in step S23 has been performed, an output image corresponding to the process in step S23 is generated; and if the process in step S32 has been performed, an output image corresponding to the process in step S32 is generated. The generated output image is outputted to the display 2 and/or the projector 8 in step S13.

As described above, in the processing shown in FIG. 19, the process is performed by using both the infrared camera 4 and the distance measuring sensor 5. In the processing shown in FIG. 19, the infrared camera 4 and the distance measuring sensor 5 have a complementary relationship with each other when the same process is performed. For example, when the distance between the portable electronic apparatus 1 and the specific object is excessively short so that the gesture input cannot be normally identified with the infrared camera 4, a process is performed on the basis of a detection result of the distance measuring sensor 5. That is, when a specific object is present in an unrecognizable range of the infrared camera 4, the specific object is detected by using the distance measuring sensor 5. On the other hand, when a specific object is present in an unrecognizable range of the distance measuring sensor 5, the specific object may be detected by using the infrared camera 4.

As described above, either of the infrared camera 4 or the distance measuring sensor 5 is selected in accordance with a detection state. Specifically, when a detection result of one of the infrared camera 4 and the distance measuring sensor 5 is not suitable for a predetermined process, the same process is performed by using a detection result of the other of the infrared camera 4 and the distance measuring sensor 5, whereby the infrared camera 4 and the distance measuring sensor 5 can complement each other. Thus, it is possible to more assuredly identify a gesture input performed by the user, and it is possible to improve the operability.

When both the infrared camera 4 and the distance measuring sensor 5 are used, a predetermined process may be performed on the basis of detection results of both the infrared camera 4 and the distance measuring sensor 5. That is, both the infrared camera 4 and the distance measuring sensor 5 may be selected and used for a predetermined process. For example, when a specific object is present in the recognizable range of the infrared camera 4, a predetermined process may be performed on the basis of an image of the specific object detected with the infrared camera 4 and the distance to the specific object calculated with the distance measuring sensor 5.

The processes shown in the flowcharts of the above-described embodiment are merely an example, a part of the processes may not be performed, and another process other than the above-described processes may be added. In addition, the order of the processes may be any order.

As described above, in the portable electronic apparatus 1 of the present embodiment, the infrared camera 4 and the distance measuring sensor 5 are provided at the side surface (right side surface) when the display 2 is viewed from the front surface, it is possible to perform a gesture input with the hand of the user by using the infrared camera 4 and the distance measuring sensor 5, and it is possible to output an output image corresponding to the gesture input, to the display 2 and the projector 8. When the infrared camera 4 is used, it is possible to identify various gestures at a position away from the portable electronic apparatus 1 by a predetermined distance. When the distance measuring sensor 5 is used, it is possible to determine whether an object is present also near the portable electronic apparatus 1, and perform a predetermined process on the basis of the distance between the object and the portable electronic apparatus 1. In addition, it is possible to perform a predetermined process by using both the infrared camera 4 and the distance measuring sensor 5. Then, it is possible to display an image as a result of the predetermined process on the display 2, project the image by using the projector 8, or vibrate the portable electronic apparatus 1 in accordance with the result of the predetermined process.

In the present embodiment, since the infrared camera 4 and the distance measuring sensor 5 are used, it is possible to recognize various gesture inputs at low cost while power consumption is reduced. That is, the irradiation section 7 instantly emits infrared light at a predetermined time interval in synchronization with the timing at which an image is captured by the infrared camera 4. For that reason, a clear image can be captured even when the time period when light is emitted is short, and thus it is possible to reduce the power consumption. In addition, when the distance measuring sensor 5 is used, it is not necessary to emit light in a wide range, and the absolute distance to the object to be detected can be calculated by only emitting light in a limited specific direction. Thus, it is possible to reduce the power consumption. For example, when a distance image sensor capable of measuring a distance for each pixel is used with a two-dimensional image, the irradiation section needs to emit light in a wide range. In addition, the electronic apparatus (or the control section) needs to calculate a distance for each pixel, and thus a processing load and power consumption increase. Moreover, the distance image sensor is more expensive than the distance measuring sensor. However, when the infrared camera 4 and the distance measuring sensor 5 are used, it is possible to identify various gesture inputs while it is possible to reduce the cost and power consumption.

Application Examples

In addition to the above-described process, the following processes may be performed by using the portable electronic apparatus 1.

FIG. 20 is a diagram showing an application example of the process performed in the portable electronic apparatus 1. For example, as shown in FIG. 20, when a gesture input of moving the right hand toward the portable electronic apparatus 1 is performed, a ball appears from the right edge of the screen of the display 2 and moves leftward in accordance with the gesture input. At that time, the faster the movement of the right hand is, the higher the moving speed of the ball is. Specifically, the portable electronic apparatus 1 calculates the absolute distance to the object by using the distance measuring sensor 5, calculates the speed of the object on the basis of a change in the distance, and sets a moving speed of the ball on the basis of the calculated speed. In addition, for example, the portable electronic apparatus 1 may calculate a relative distance to the object on the basis of an image from the infrared camera 4, and may calculate the speed of the object on the basis of a change in the relative distance. Then, when the user presses the input button 6B (or touches the screen of the display 2) with their left hand at the timing at which the ball reaches the left edge of the screen, the ball bounces in the opposite direction. When the timing at which the input button 6B is pressed deviates from the timing at which the ball reaches the left edge of the screen, the ball does no bounce in the opposite direction. When the user presses the input button 6B with their left hand at the timing at which the ball reaches the left edge of the screen, the ball may bounce in the opposite direction, and the vibrator 11 may be operated to provide vibration to the left hand, or a sound may be outputted. An application for displaying an image on the display 2 in accordance with a gesture input performed with the right hand and causing an input to be performed by using the left hand after a predetermined time period elapses, as described above, may be executed.

In another application example, for example, a predetermined image may be displayed by using the outer camera 9 and an input using the infrared camera 4 and/or the distance measuring sensor 5. Specifically, while an image captured by the outer camera 9 is displayed on the display 2 in real time, a gesture input performed by the user may be detected by using the infrared camera 4 and/or the distance measuring sensor 5, and an image corresponding to the gesture input may be displayed so as to be superimposed on the image captured by the outer camera 9.

FIG. 21 is a diagram showing an example of an image displayed on the display 2 when a process using the outer camera 9 and the infrared camera 4 and/or the distance measuring sensor 5 is performed.

As shown in FIG. 21, for example, a predetermined marker 60 is placed in the real space. When an image of the marker 60 is captured by the outer camera 9, the image captured by the outer camera 9 (a real camera) is displayed on the display 2, and a virtual object is displayed so as to be superimposed at the position of the marker included in the captured image. The user operates the virtual object through a gesture input with their right hand. For example, when the user moves the right hand in the direction of an arrow in FIG. 21, the virtual object may move leftward. Specifically, the portable electronic apparatus detects the position and the attitude of the marker from the captured image acquired from the real camera, and calculates a positional relation between the real camera and the marker. The portable electronic apparatus sets a coordinate system (e.g., a coordinate system having an origin at the marker) of a virtual space on the basis of the calculated positional relation, and sets a virtual camera in the virtual space. For example, the virtual camera is placed at a position, in the virtual space, corresponding to the position of the real camera in the real space. In addition, the portable electronic apparatus places a virtual object at a predetermined position (e.g., the origin) in the virtual space. Then, on the basis of a gesture input performed by the user, the virtual object in the virtual space is operated, and an image of the virtual object is captured by the virtual camera. The image of the virtual space obtained thus and the image of the real space captured by the outer camera 9 are superimposed and displayed on the display 2.

For example, when an image including the marker shown in FIG. 21 and a specific object is acquired from the outer camera 9, the portable electronic apparatus performs image recognition processing on the acquired image. On the basis of a result of the image recognition processing, the portable electronic apparatus displays a fish object and a fishing rod object (virtual objects) such that the fish object and the fishing rod object are superimposed on the image of the real space captured by the outer camera 9. At that time, when the user makes a gesture in the right side surface direction of the portable electronic apparatus as if rotating a reel on a fishing rod, the portable electronic apparatus recognizes the gesture. Then, the portable electronic apparatus performs, on the display 2, a display in which fish is caught.

As described above, a process using the outer camera 9 and the infrared camera 4 and/or the distance measuring sensor 5 may be performed, and an image obtained by combining the real world and the virtual space may be displayed on the display 2.

Figure 22:
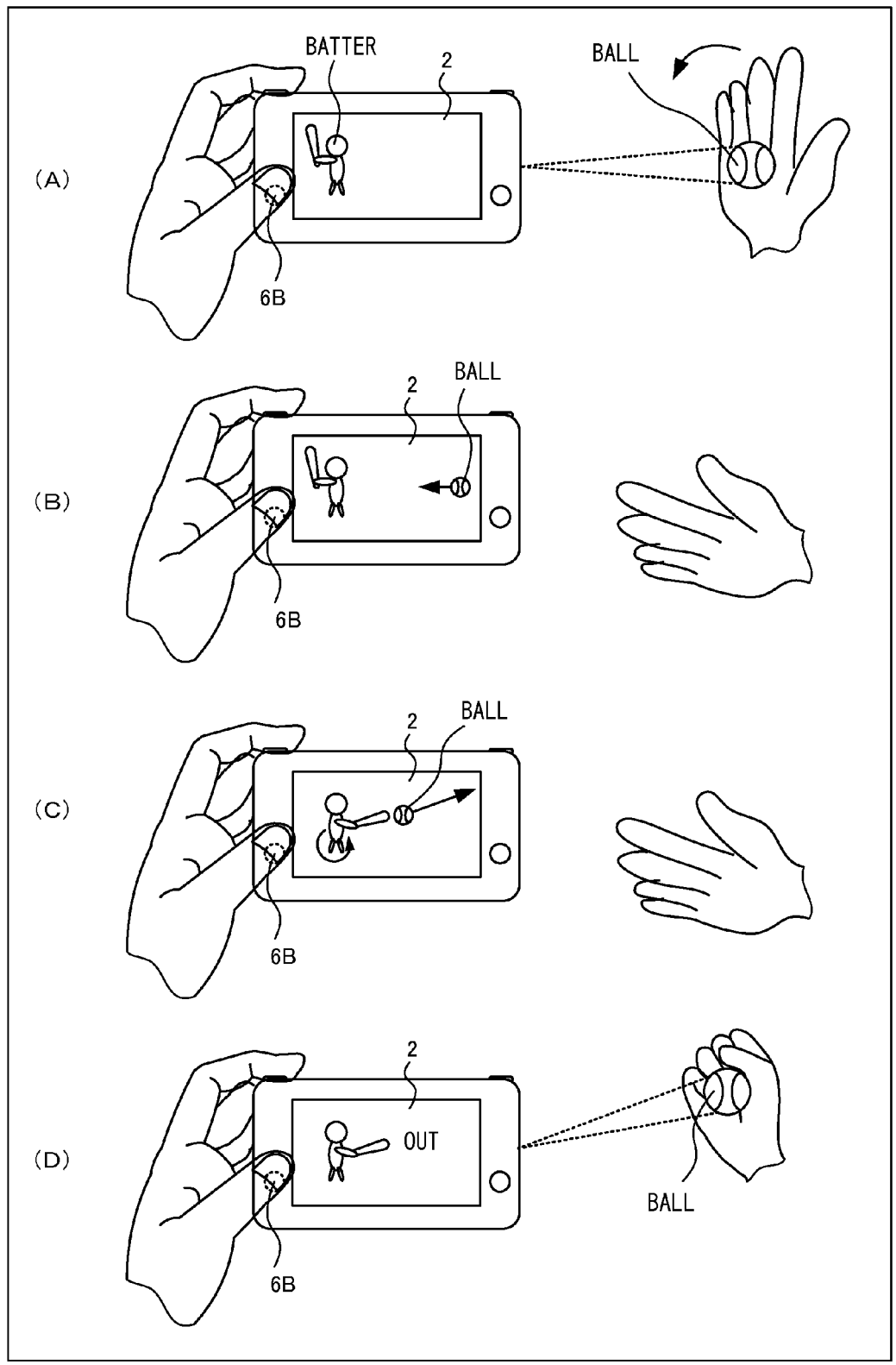
FIG. 22 is an example non-limiting diagram showing an example of a game for which the projector 8 and the display 2 are linked to each other.

In another application example, a game may be performed in which an image projected by the projector 8 and an image displayed on the display 2 are linked to each other. FIG. 22 is a diagram showing an example of the game in which the projector 8 and the display 2 are linked to each other.

As shown in (A) of FIG. 22, a batter is displayed on the display 2. When the user makes a gesture of "paper" with their right hand, the portable electronic apparatus 1 recognizes the gesture on the basis of an image from the infrared camera 4, and projects an image of a ball onto the right hand of the user by using the projector 8. Next, when the user makes a gesture of swinging their right hand, the image of the ball projected on the right hand of the user disappears, and the ball appears from the right edge of the display 2 and moves in the leftward direction of the screen ((B) of FIG. 22). When the user presses the input button 6B at the timing at which the ball reaches a predetermined range of the batter, the batter hits back the ball ((C) of FIG. 22). The hit-back ball moves in the rightward direction of the screen. The user makes a gesture of "rock" at predetermined timing (timing at which the hit-back ball reaches the right hand) after the ball reaches the right edge of the display 2. Accordingly, an image of the ball is projected onto the right hand of the user as if the user caught the hit-back ball ((D) of FIG. 22). At that time, characters "OUT" indicating that the user is successful in catching the ball may be displayed on the display 2, and a sound may be outputted, or the portable electronic apparatus 1 may vibrate. The portable electronic apparatus 1 may recognize the position of the right hand of the user (a position on a plane parallel to the right side surface of the portable electronic apparatus, and/or a position in a direction perpendicular to the right side surface) on the basis of an image from the infrared camera 4 or a distance measured by the distance measuring sensor 5, and may project an image of the ball onto the right hand of the user in accordance with a result of the recognition. When the user does not make a gesture of "rock" at the above-described predetermined timing or the timing at which the gesture of "rock" is made deviates from the above-described predetermined timing, the user fails in catching the ball, and the image of the ball as shown in (D) of FIG. 22 is not projected onto the right hand. For example, an image different from the ball may be projected onto the right hand, or characters "ERROR" or "HIT" may be displayed on the display 2. When a gesture made by the user cannot be recognized with the infrared camera 4, the same process as described above may be performed by detecting movement of the hand with the distance measuring sensor 5.

In another application example, the absolute distance to an object (unspecified object) may be calculated by using the distance measuring sensor 5, and on the basis of the calculated distance, an image may be outputted to the display 2 or an image may be projected by using the projector 8. For example, in the application example shown in FIG. 22, whether the ball is successfully caught may be determined on the basis of the absolute distance to the right hand in catching, and an image corresponding to a result of the determination may be displayed on the display 2. In addition, the position of the specific object in a three-dimensional space may be detected by detecting the position of the specific object from the image captured by the infrared camera 4 (its position on the image) and detecting the distance to the specific object with the distance measuring sensor 5. Then, on the basis of the position of the specific object in the three-dimensional space, a predetermined process may be performed, and an image based on a result of the predetermined process may be displayed on the display 2 or may be projected with the projector 8.

In another application example, on the basis of an image captured by the infrared camera 4, a distance (relative distance) of the specific object may be calculated, and the vibrator 11 may be vibrated in accordance with the calculated distance. For example, when the distance to the object is shorter or longer than a predetermined threshold, the vibrator 11 may be vibrated. In addition, the absolute distance to the specific object may be calculated by using the distance measuring sensor 5, and the vibrator 11 may be vibrated in accordance with the calculated distance. In addition, movement of the specific object (e.g., movement of the right hand or movement of another object) may be detected by using the infrared camera 4 and/or the distance measuring sensor 5, and the vibrator 11 may be vibrated in accordance with the movement of the specific object. As a specific example, in accordance with the user moving their right hand as if playing guitar, a sound is outputted and the portable electronic apparatus 1 is vibrated. At that time, an image of guitar strings is displayed on the display 2, and the sound may be changed when the strings displayed on the display 2 are pressed with a finger of the left hand. In such an application example, as the user moves their right hand faster, a louder sound may be outputted and the portable electronic apparatus 1 may be more strongly vibrated.

Although a plurality of the examples of the process using the infrared camera 4 and/or the distance measuring sensor 5 have been described above, any other processes may be performed. For example, a game may be executed in which in accordance with a content instructed on the display 2 or through a voice, the user is caused to make a gesture at predetermined timing. In such a game, when a predetermined gesture is made at the predetermined timing, points are added; and when the timing at which a gesture is made by the user deviates from the predetermined timing or a gesture different from a predetermined gesture is made, no points are added.

As described above, in the portable electronic apparatus 1 of the present embodiment, a predetermined process is performed in accordance with the type of the application to be executed, and the infrared camera 4 and the distance measuring sensor 5 are used for the predetermined process. For example, in a certain application, an image from the infrared camera 4 may be used for a predetermined process. In addition, in a certain application, a distance calculated by the distance measuring sensor 5 is used for a predetermined process. Moreover, in a certain application, both the infrared camera 4 and the distance measuring sensor 5 are used for a predetermined process. For example, in the case where an application is executed in which a specific object (a predetermined object) is detected and a process based on the detection result is performed, the infrared camera 4 is used. On the other hand, in the case where an application is executed in which an unspecified object is detected and a process is performed based the distance to the unspecified object, the distance measuring sensor 5 is used.

In a certain application, either one of the infrared camera 4 or the distance measuring sensor 5 is selected in accordance with a detection state, and the selected one is used for a predetermined process. For example, when a specific object cannot be detected in an image from the infrared camera 4 or the type of a gesture cannot be identified, the distance measuring sensor 5 is selected instead of the infrared camera 4. On the basis of information from the selected distance measuring sensor 5, movement of the object is detected, and predetermined information processing is performed in accordance with the detected movement. That is, of the infrared camera 4 and the distance measuring sensor 5, the infrared camera 4 is preferentially used for detecting an object. Then, on the basis of a result of the predetermined information processing, an image is displayed on the display 2 or projected with the projector 8. Of the infrared camera 4 and the distance measuring sensor 5, the distance measuring sensor 5 may be preferentially used for detecting an object.

In another application example, when the user plays a game while holding the portable electronic apparatus 1 with both hands, if the user releases their right hand, the portable electronic apparatus 1 may display a menu screen on the display 2 instead of (or in addition to) a game image. The user is allowed to, for example, end the game being currently executed, store a progress status of the game, execute another game, or changes settings of the portable electronic apparatus 1, through an operation with the menu screen. Specifically, the portable electronic apparatus 1 detects that the user has released their right hand, by using the infrared camera 4 or the distance measuring sensor 5. Then, when the portable electronic apparatus 1 detects that the user has released their right hand, the portable electronic apparatus 1 pauses the game processing being currently executed, and displays the menu screen.

In the above-described portable electronic apparatus 1, the infrared camera 4, the distance measuring sensor 5, and the like are disposed at the right side surface. However, when the user performs a gesture input with their left hand, the portable electronic apparatus 1 having the attitude shown in FIG. 1 is rotated 180 degrees (i.e., the portable electronic apparatus 1 in FIG. 1 is turned upside down). The portable electronic apparatus 1 detects, for example, gravity by using the attitude detection section 16, thereby detecting that the portable electronic apparatus 1 has been rotated. Then, an image to be displayed on the display 2 is rotated in accordance with the detected attitude of the portable electronic apparatus 1.

Figure 23:
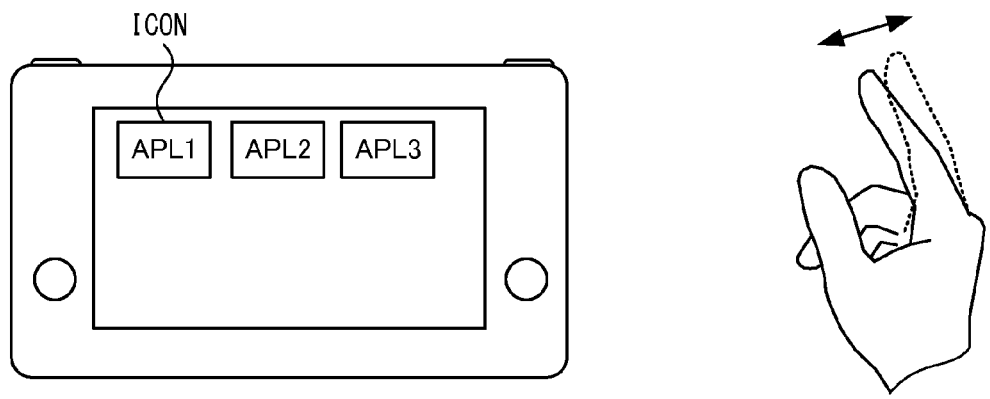
FIG. 23 is an example non-limiting diagram showing an example a click operation.
Figure 24A:
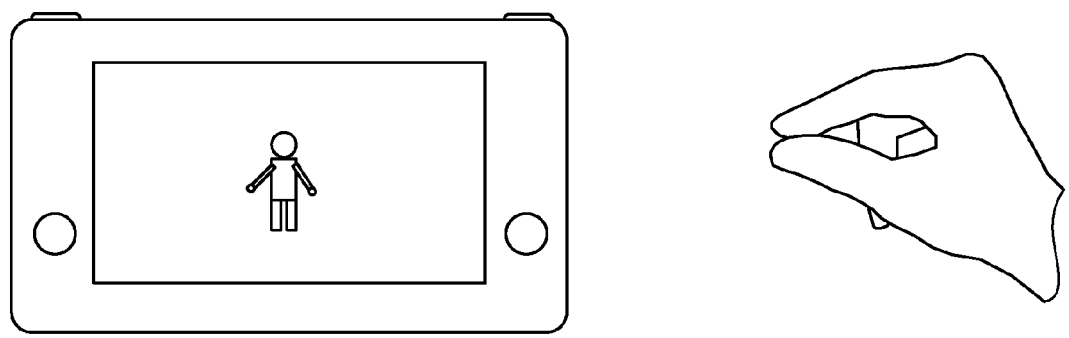
FIG. 24A is an example non-limiting diagram showing an example of a pinch-in/pinch-out operation.
Figure 24B:
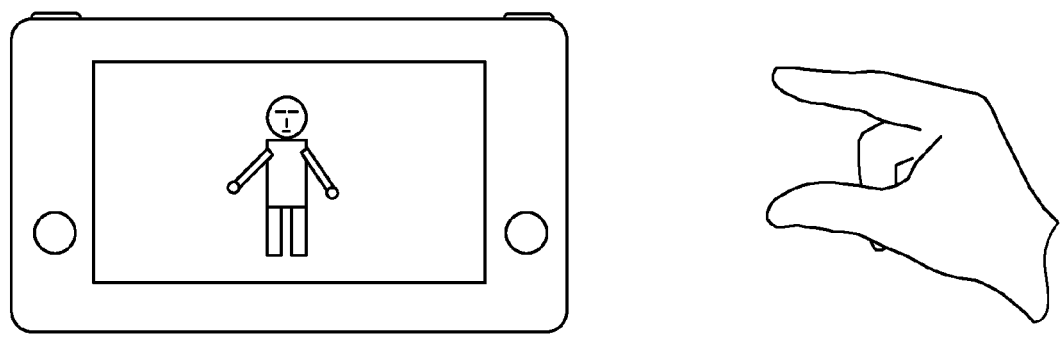
FIG. 24B is an example non-limiting diagram showing an example of a pinch-in/pinch-out operation.
Figure 25:
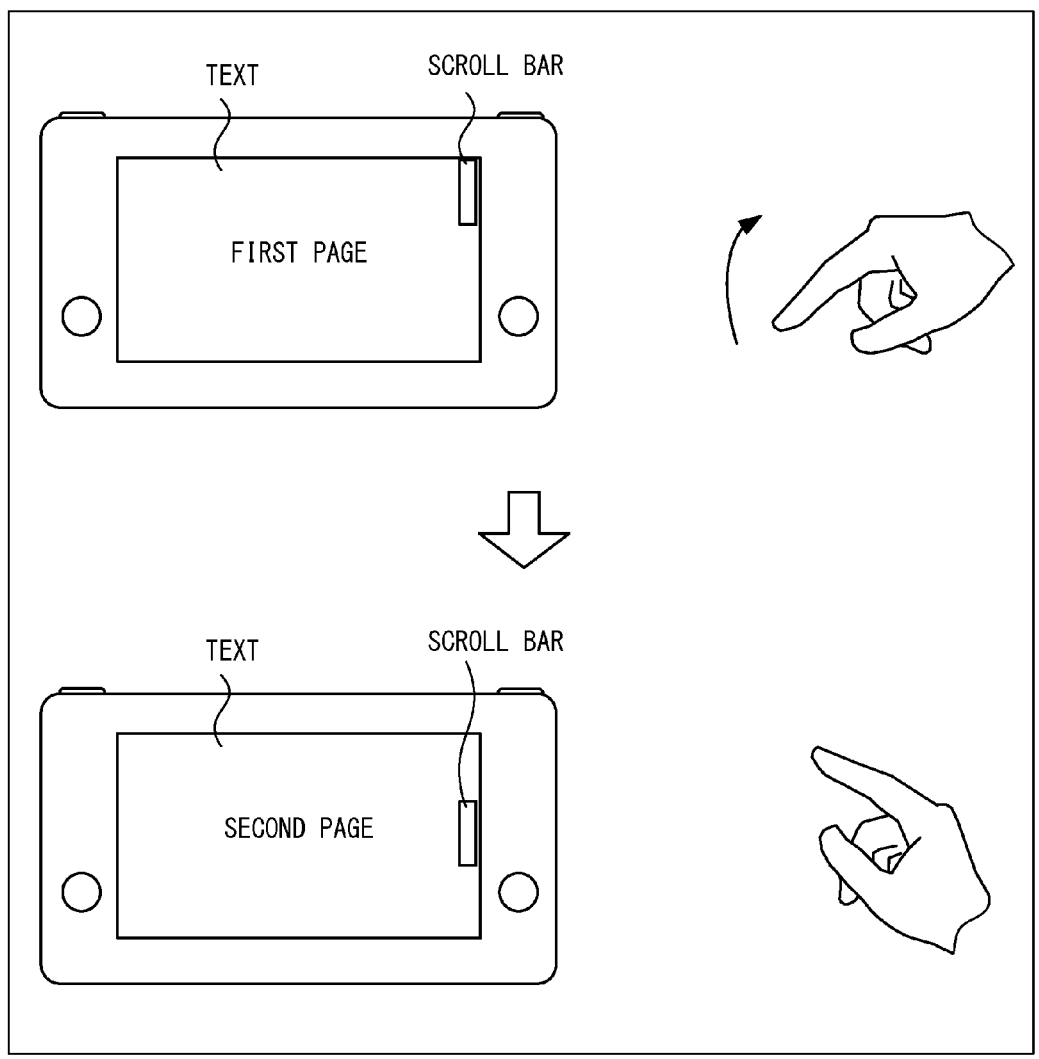
FIG. 25 is an example non-limiting diagram showing an example of a flick operation.

In another application example, by capturing an image of the hand of the user with the infrared camera 4, a click operation, a pinch-in/pinch-out operation, a flick operation, or the like may be detected as a gesture operation performed by the user, and various processes corresponding to the detection result may be performed. FIG. 23 is a diagram showing an example of the click operation. FIGS. 24A and 24B are each a diagram showing an example of the pinch-in/pinch-out operation. FIG. 25 is a diagram showing an example of the flick operation. In FIGS. 23 to 25, for convenience of explanation, a view obtained when the screen of the portable electronic apparatus 1 is viewed from the front surface is shown at the left side, and a view obtained when a hand (a hand viewed from the infrared camera 4) is viewed from its side is shown at the right side, but the direction in which a gesture is made is not limited thereto. For example, a gesture operation may be performed such that the hand is seen as shown in FIGS. 23 to 25 when the user sees the portable electronic apparatus 1 and their hand (a gesture operation may be performed such that the palm of the hand faces the infrared camera 4).

For example, as shown in FIG. 23, in the click operation, the user performs an operation as if clicking a button of a mouse (an operation as if tapping a touch screen) by using their index finger or the like, in the side surface direction of the portable electronic apparatus 1 (the imaging range of the infrared camera 4). Specifically, the portable electronic apparatus 1 detects a user's hand from a captured image, and detects whether the palm portion other than the fingers is not moving and only the finger is moving. For example, the portable electronic apparatus 1 determines whether the finger is moving, by determining whether the finger has made a reciprocal movement within a predetermined time period. When such a click operation is detected, a predetermined process is performed in the portable electronic apparatus 1. For example, as a predetermined process corresponding to the click operation, the portable electronic apparatus 1 may select one object from among a plurality of objects (any objects such as game objects, an icon indicating an application, an icon indicating a file, and the like) displayed on the display 2, may execute (or open) an application or file corresponding to the selected object, or may display information regarding the selected object. In addition, the portable electronic apparatus 1 may determine whether a click operation is a single click operation or a double click operation, and may perform a different process in accordance with each operation. Here, a single click operation is an operation in which a click operation is performed once within a predetermined time period, and a double click operation is an operation in which a click operation is performed twice within the predetermined time period. For example, the portable electronic apparatus 1 may select an object in accordance with a single click operation. In addition, the portable electronic apparatus 1 may select an object in accordance with a double click operation, and may perform a process corresponding to the selected object (a process of operating a selected game object, executing an application corresponding to the selected object, or opening a file corresponding to the selected object). As described above, when an operation of causing a finger to make a reciprocal movement in a predetermined direction a predetermined number of times is detected, the portable electronic apparatus 1 may perform a process of selecting an object displayed on the screen.

As shown in FIGS. 24A and 24B, in the pinch-in/pinch-out operation, the user performs an operation of decreasing the interval between their two fingers (their thumb and index finger) (pinch-in) or increasing the interval (pinch-out) in the side surface direction of the portable electronic apparatus 1 (the imaging range of the infrared camera 4). For example, when a state where the interval between the thumb and the index finger is small (the fingers are closed) as shown in FIG. 24A has shifted to a state where the interval between the thumb and the index finger are large (the fingers are opened) as shown in FIG. 24B (pinch-out), an image or characters displayed on the display 2 may be enlarged (the display range may be reduced). On the other hand, when the state where the interval between the thumb and the index finger is large as shown in FIG. 24B has shifted to the state where the interval between the thumb and the index finger is small as shown in FIG. 24A (pinch-in), the image or the characters displayed on the display 2 may be reduced (the display range may be enlarged). Specifically, the portable electronic apparatus 1 determines that the interval between the thumb and the index finger is small (FIG. 24A), when the interval between the thumb and the index finger is 0 or not greater than a first predetermined value on the basis of an image captured by the infrared camera 4. In addition, the portable electronic apparatus 1 determines that the interval between the thumb and the index finger is large (FIG. 24B), when the interval between the thumb and the index finger is equal to or greater than a second predetermined value which is greater than the first predetermined value. The first predetermined value and the second predetermined value may be relatively set, for example, in accordance with the length of a finger. For example, the first predetermined value may be set by multiplying, by a predetermined first coefficient, the length of a finger detected as the index finger, and the second predetermined value may be set by multiplying the length of the index finger by a predetermined second coefficient (a value greater than the first coefficient). In addition, for example, the portable electronic apparatus 1 may detect the tips of two fingers (e.g., the thumb and the index finger), may draw a virtual circle having a diameter which is equal to the distance between the tips of the two fingers, and may determine whether the current state is the state shown in FIG. 24A or the state shown in FIG. 24B, on the basis of the size of the circle. For example, the portable electronic apparatus 1 may determine that the fingers are opened, if the diameter of the circle is equal to or greater than a predetermined value. Whether the state shown in FIG. 24A has shifted to the state shown in FIG. 24B or the state shown in FIG. 24B has shifted to the state shown in FIG. 24A can be determined, for example, as follows. For example, after a predetermined time period elapses from detection of the state shown in FIG. 24A, when the state shown in FIG. 24B is detected and is maintained for a predetermined period, the portable electronic apparatus 1 can determine that the state shown in FIG. 24A has shifted to the state shown in FIG. 24B. On the other hand, after the predetermined time period elapses from detection of the state shown in FIG. 24B, when the state shown in FIG. 24A is detected and is maintained for the predetermined period, the portable electronic apparatus 1 can determine that the state shown in FIG. 24B has shifted to the state shown in FIG. 24A. As described above, when at least an operation of changing the interval between two fingers is detected, the portable electronic apparatus 1 may enlarge or reduce an image displayed on the screen. For example, an image and characters may be enlarged or reduced to a size corresponding to the interval between the thumb and the index finger. For example, an image, characters, or the like displayed on the screen may be gradually enlarged by the interval between the thumb and the index finger being gradually changed from a state where the interval is small to a state where the interval is large, or the image, characters, or the like may be gradually reduced by the interval between the finger being gradually decreased.

As shown in FIG. 25, in the flick operation, the user quickly moves, for example, their finger (e.g., their index finger) as if flicking in the side surface direction of the portable electronic apparatus 1 (the imaging range of the infrared camera 4). For example, as shown in FIG. 25, a content such as a text or an image which cannot be displayed on one screen is displayed on the screen of the display 2, and the first page of the content is displayed. In such a state, when the user quickly moves, for example, their finger upward from below (or downward from above), the screen scrolls downward such that the second page of the content is displayed. In addition, as shown in FIG. 25, a scroll bar indicating which part of the entire content is displayed on the screen may be displayed at the right edge of the screen, or may not be displayed. In the case where the scroll bar is displayed, as shown in FIG. 25, the screen is scrolled downward in accordance with the flick operation, and the scroll bar also moves downward. In addition, in order to scroll the screen upward, the user only needs to quickly move their finger downward from above. In order to scroll the screen in the right-left direction, the user only needs to quickly move their finger in the right-left direction. The screen may be continuously scrolled by a flick operation. The speed of scrolling may be different depending on the moving speed of the finger. For example, when the user slowly moves their finger (swipes) while the finger is raised, the screen may be slowly and continuously scrolled. A flick operation does not necessarily need to be performed with the index finger, and may be performed by using another finger or the entire hand. For example, when a flick operation is performed by using the entire hand together with the fingers, the portable electronic apparatus 1 can easily distinguish the flick operation from a click operation. The case where a flick operation is performed by using only a finger and the case where a click operation is performed are common in moving the finger, but the portable electronic apparatus 1 can distinguish between these operations on the basis of an amount by which the finger moves or a speed at which the finger moves. For example, when a finger has moved in a predetermined direction and the moving speed of the finger is equal to or higher than a predetermined value, the portable electronic apparatus 1 can determine that a flick operation has been performed. In addition, different process may be performed between when a flick operation is performed in the up-down direction and when a flick operation is performed in the right-left direction. For example, when a flick operation in the up-down direction is detected, the portable electronic apparatus 1 may scroll the screen in the up-down direction; and when a flick operation in the right-left direction is detected, the portable electronic apparatus 1 may perform a process different from scrolling of the screen (e.g., a process of returning to a screen which is previously displayed). As described above, when an operation of flicking a finger in a certain direction (moving the finger in the certain direction) is detected, the portable electronic apparatus 1 may perform a process of scrolling the screen.

As an example of another gesture operation, a gesture operation of changing the shape of a hand may be performed while the hand is moved toward and away from the portable electronic apparatus 1, and a predetermined process may be performed in accordance with the gesture operation. FIG. 26 is a diagram showing an example of a process corresponding to a gesture operation of changing the shape of a hand while the hand is moved toward and away from the portable electronic apparatus 1.

For example, as shown in FIG. 26, when the user moves their hand toward the portable electronic apparatus 1 at a predetermined speed or faster while changing the hand from "rock" to "paper" in the side surface direction of the portable electronic apparatus 1 (the imaging range of the infrared camera 4), a predetermined process is performed. For example, as the predetermined process, a file may be stored into a folder, or a predetermined object may be stored into a predetermined location. In addition, when the user performs an operation reversed to the above operation, the predetermined object is taken out from the stored location. That is, when the user moves their hand away from the portable electronic apparatus 1 while changing the hand from "paper" to "rock", the object is taken out as the predetermined process. The predetermined process corresponding to such a gesture operation is not limited to the process of operating the file as shown in FIG. 26. For example, in accordance with such a gesture operation in which a distance is changed and the shape of the hand is changed, a process of taking out or storing a predetermined game object may be performed in game processing. The distance between the portable electronic apparatus 1 and the hand may be measured by using the distance measuring sensor 5, or by using an image captured by the infrared camera 4. For example, the portable electronic apparatus 1 can acquire an image from the infrared camera 4, and can measure a relative distance between the portable electronic apparatus 1 and the hand on the basis of the brightness of the hand in the image. The intensity of the infrared light emitted by the irradiation section 7 decreases with increasing the distance. Thus, the smaller the distance between the hand and the portable electronic apparatus 1 is, the brighter the image of the hand is; and reversely, the larger the distance is, the darker the image of the hand is. Therefore, the portable electronic apparatus 1 can calculate the brightness of an object (may be detected as a hand or may not be detected as hand) from the image captured by the infrared camera 4, and can measure a relative distance between the object and the portable electronic apparatus 1 on the basis of the brightness. The portable electronic apparatus 1 can calculate the moving speed of the hand on the basis of a change in the relative distance calculated thus. In addition, the portable electronic apparatus 1 may calculate a relative distance between the portable electronic apparatus 1 and the hand on the basis of the size of the hand. The portable electronic apparatus 1 recognizes that the gesture operation shown in FIG. 26 has been performed, on the basis of the distance calculated thus and the shape of the hand, and performs various processes in accordance with the gesture operation.

The portable electronic apparatus 1 may change the process content on the basis of the number of detected fingers. For example, different processes may be performed between when a predetermined operation is performed in a state where one finger is raised and when a predetermined operation is performed in a state where two fingers are raised. For example, when one finger that is raised is swung in a predetermined pattern, a click operation may be determined to have been performed, and a process corresponding to this operation (e.g., a selection process) may be performed. When two fingers that are raised are swung in a predetermined pattern, a flick operation (or a swipe operation) may be determined to have been performed, and a process corresponding to this operation (a scroll process) may be performed.

Modifications

The above-described embodiment is merely an example, and, for example, the following modifications may be made.

For example, the portable electronic apparatus 1 may detect various objects, other than the above-described gesture inputs using the user's hand, may perform predetermined processes in accordance with detection results of the objects, and may output results of the predetermined processes to the display 2 or the projector 8. For example, an input with respect to the portable electronic apparatus may be performed by capturing, with the infrared camera 4, an image of a specific object present in the side surface direction. For example, when the user performs an operation with respect to the specific object, the position or attitude of the specific object changes. When an image of the specific object is captured by the infrared camera 4, an operation performed by the user with respect to the specific object can be detected. Then, a result of a process corresponding to this operation is outputted to the display 2 or the like. In this case, the portable electronic apparatus 1 may detect both the user's hand and an object held by the user, or may detect only the object.

Figure 27:
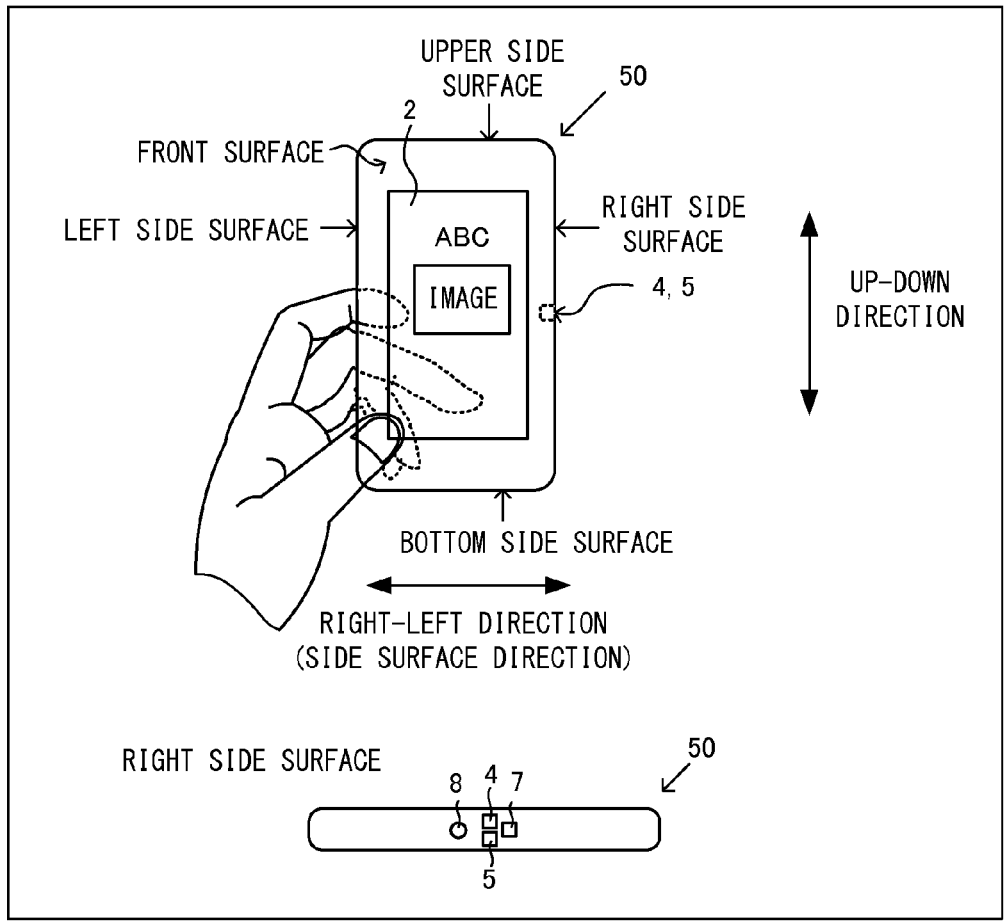
FIG. 27 is an example non-limiting diagram showing an example of a vertically long portable electronic apparatus 50.
Figure 28:
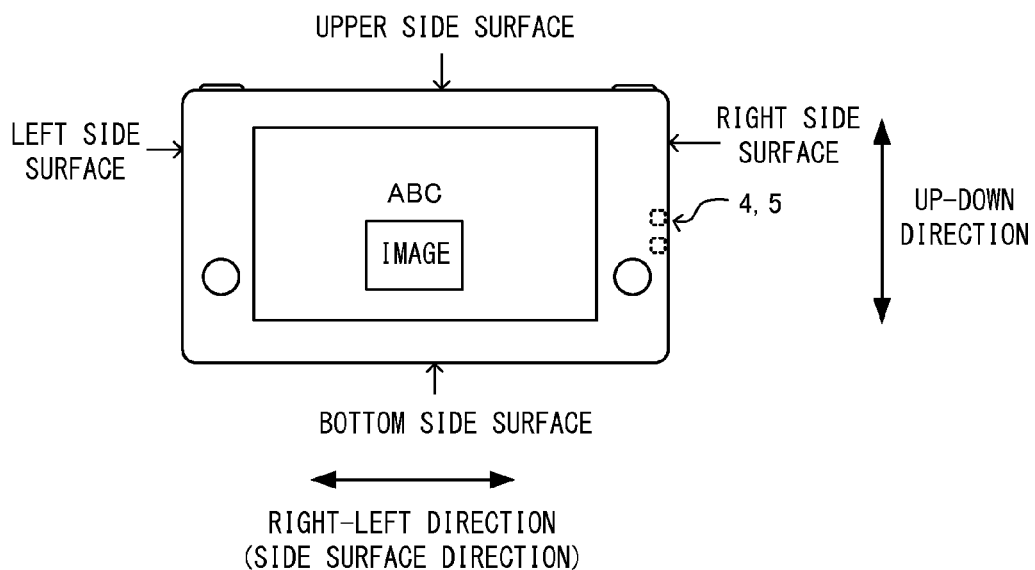
FIG. 28 is an example non-limiting diagram showing an example of a horizontally long portable electronic apparatus.

The shape of the portable electronic apparatus 1 may be any shape. For example, the portable electronic apparatus 1 (the display 2) may not be horizontally long, may be vertically long, or may have a square shape. FIG. 27 is a diagram showing an example of a vertically long portable electronic apparatus 50. FIG. 28 is a diagram showing an example of a horizontally long portable electronic apparatus. Although the input button 6 is not shown in FIG. 27, the portable electronic apparatus 50 may include the input button 6. As shown in FIG. 27, the display 2 is provided at the front surface of the vertically long portable electronic apparatus 50, and the infrared camera 4, the distance measuring sensor 5, and the projector 8 are provided at the right side surface of the portable electronic apparatus 50. As described above, also with the portable electronic apparatus 50, by using the infrared camera 4 and the distance measuring sensor 5 provided at the right side surface, the user is allowed to perform a gesture input with their right hand from the right side surface direction of the portable electronic apparatus 50.

As described above, in the portable electronic apparatus of the present embodiment, even when the screen is vertically long or horizontally long, the infrared camera 4 and the like are provided in the side surface direction (right-left direction) when the screen is viewed from the front surface. Here, the phrase "the screen is viewed from the front surface" means that the screen is viewed such that a character string, an image, or the like displayed on the screen of the display 2 can be seen from an ordinary direction. For example, in FIG. 27, when the portable electronic apparatus is held such that the screen is vertically long, a character string "ABC" and an image displayed on the screen can be viewed from the ordinary direction, and thus this state is a state where the screen is viewed from the front surface. In addition, for example, in FIG. 28, when the portable electronic apparatus is held such that the screen is horizontally long, a character string "ABC" and an image displayed on the screen can be viewed from the ordinary direction, and thus this state is a state where the screen is viewed from the front surface.

As used herein, the "side surface" may include a bottom side surface facing downward and an upper side surface facing upward when the screen is viewed from the front surface as shown in FIGS. 27 and 28. That is, in the portable electronic apparatus of the present embodiment, the infrared camera 4, the distance measuring sensor 5, and the like may be provided at the "upper side surface" facing upward or the "bottom side surface" facing downward when the screen is viewed from the front surface, or the infrared camera 4, the distance measuring sensor 5, and the like may be provided at the "left side surface" facing leftward or the "right side surface" facing rightward when the screen is viewed from the front surface.

Figure 29:
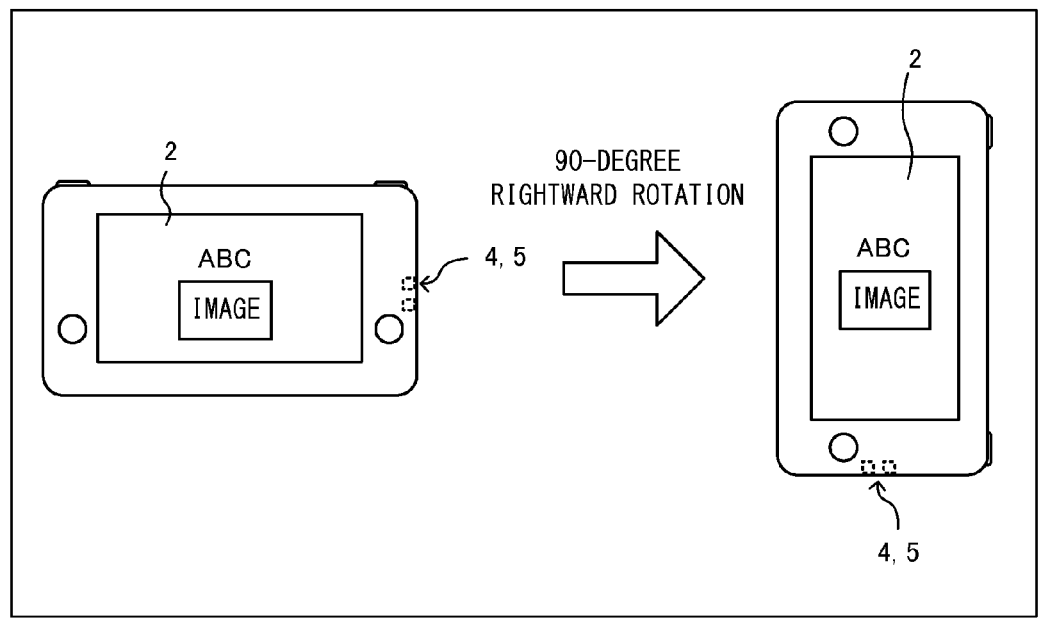
FIG. 29 is an example non-limiting diagram showing a state where a portable electronic apparatus provided with the infrared camera 4, the distance measuring sensor 5, and the like at a side surface when a screen is viewed from a front surface is rotated rightward 90 degrees.

The portable electronic apparatus of the present embodiment may detect the attitude of the portable electronic apparatus by using the attitude detection section 16, and may rotate a character, an image, or the like displayed on the screen, in accordance with the detected attitude. FIG. 29 is a diagram showing a state where a portable electronic apparatus provided with the infrared camera 4, the distance measuring sensor 5, and the like at a side surface when the screen is viewed from the front surface is rotated rightward 90 degrees.

As shown in FIG. 29, when the portable electronic apparatus is held such that the screen is horizontally long, characters and an image on the screen are viewed from the ordinary direction, and the infrared camera 4, the distance measuring sensor 5, and the like are provided at the right side surface when the screen is viewed from the front surface. Meanwhile, when the portable electronic apparatus is rotated rightward 90 degrees, the attitude detection section 16 detects, for example, gravity, whereby the portable electronic apparatus detects the attitude of the portable electronic apparatus. The portable electronic apparatus rotates the characters and the image displayed on the display 2, in accordance with a result of the detection, such that the characters and the image can be viewed from the front surface. That is, even after the 90-degree rightward rotation, the user can view the screen of the portable electronic apparatus from the front surface. In this case, the infrared camera 4, the distance measuring sensor 5, and the like are located at the bottom side surface when the screen of the portable electronic apparatus is viewed from the front surface. Such a portable electronic apparatus is also included in the scope of the present embodiment.

That is, depending on a manner in which the portable electronic apparatus is held, the infrared camera 4, the distance measuring sensor 5, and the like may be located downward of the screen or upward of the screen. When the portable electronic apparatus is held in a certain attitude by the user, the infrared camera 4, the distance measuring sensor 5, and the like are located at a surface facing in the right-left direction relative to the screen when the user views the screen from its front surface (characters, an image, or the like displayed on the screen can be viewed from the ordinary direction). In such an attitude, the user can perform a gesture input with respect to the portable electronic apparatus by making a gesture with their right hand or left hand) from the rightward direction (or leftward direction) relative to the screen as described above. In addition, when the portable electronic apparatus is held in another attitude by the user, the infrared camera 4, the distance measuring sensor 5, and the like are located at a surface facing in the up-down direction relative to the screen when the user views the screen from its front surface. In such an attitude, the user can perform a gesture input with respect to the portable electronic apparatus by making a gesture with their right hand (or left hand) in the upward direction (or downward direction) relative to the screen as described above.

For example, a configuration in which the infrared camera 4, the distance measuring sensor 5, and the projector 8 are provided at not only the side surface but also the upper side surface or the bottom side surface is also included in the scope of the present embodiment. In addition, the infrared camera 4, the distance measuring sensor 5, and the like may be provide at each of the left side surface and the right side surface. In this case, for example, which of the left side or the right side of the portable electronic apparatus is held by the user may be determined on the basis of a distance measured by each distance measuring sensor. For example, the portable electronic apparatus may determine that a side surface (held portion) corresponding to the shorter measured distance is held by the user.

Figure 30:
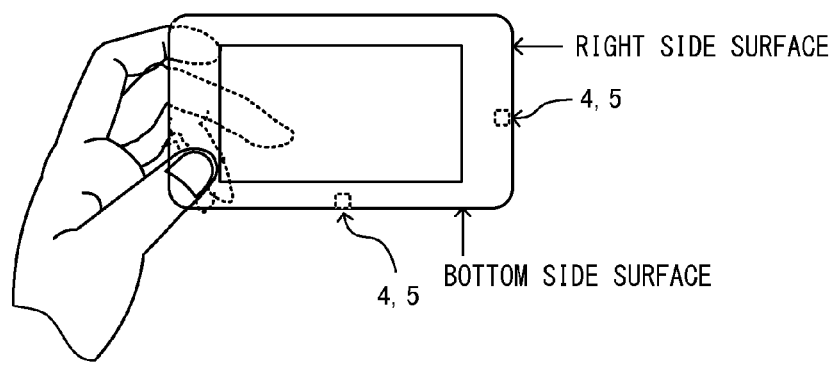
FIG. 30 is an example non-limiting diagram showing an example of a configuration in which the infrared camera 4, the distance measuring sensor 5, and the like are provided at each of a side surface and a bottom side surface.

FIG. 30 is a diagram showing an example of a configuration in which the infrared camera 4, the distance measuring sensor 5, and the like are provided at each of a side surface and a bottom side surface. As shown in FIG. 30, the infrared camera 4, the distance measuring sensor 5, and the like are provided at the right side surface of the portable electronic apparatus, and the infrared camera 4, the distance measuring sensor 5, and the like are provided also at the bottom side surface of the portable electronic apparatus. The user can perform a gesture input or the like by using their right hand while holding the portable electronic apparatus with their left hand. With such a configuration, even when the portable electronic apparatus is held so as to be horizontally long, or even when the portable electronic apparatus is held so as to be vertically long, the infrared camera 4, the distance measuring sensor 5, and the like are located in the lateral direction, and thus the above-described gesture input can be performed in the lateral direction relative to the screen.

The portable electronic apparatus may have any configuration as long as the user is allowed to perform a gesture input with their right hand (or left hand) from the side surface direction relative to the screen of the display while holding the portable electronic apparatus with their left hand (or right hand) and viewing the screen from the front surface as described above.

In the above-described embodiment, the infrared camera 4, the distance measuring sensor 5, and the like are directed in a direction perpendicular to the side surface (parallel to the screen). However, in another configuration, the infrared camera 4, the distance measuring sensor 5, and the like may be provided so as to be tilted at a predetermined angle relative to the side surface.

Figure 31:
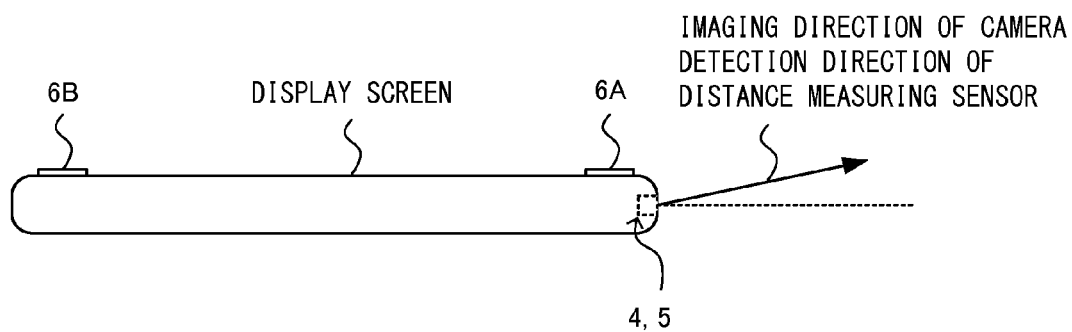
FIG. 31 is an example non-limiting diagram of a portable electronic apparatus in which the infrared camera 4 and the distance measuring sensor 5 are tilted, as viewed from a bottom side surface.

FIG. 31 is a diagram of a portable electronic apparatus in which the infrared camera 4 and the distance measuring sensor 5 are tilted, as viewed from the bottom side surface. As shown in FIG. 31, the imaging direction of the infrared camera 4 may be tilted at a predetermined angle in a direction toward the screen side, not in the direction perpendicular to the right side surface of the portable electronic apparatus. In addition, the detection direction of the distance measuring sensor 5 (a direction in which light is emitted from the light source thereof) may be tilted at a predetermined angle in the direction toward the screen side, not in the direction perpendicular to the right side surface of the portable electronic apparatus. Similarly, the projector 8 may be tilted at a predetermined angle in the direction toward the screen side, not in the direction perpendicular to the right side surface of the portable electronic apparatus. When the infrared camera 4, the distance measuring sensor 5, and the projector 8 are tilted in the direction toward the screen side as described above, the user performs a gesture input with their hand at a predetermined position in the direction toward the screen side, not at a position just beside the portable electronic apparatus. The tilts of the infrared camera 4, the distance measuring sensor 5, and the projector 8 may be adjusted as appropriate such that the user easily performs a gesture input. For example, the infrared camera 4, the distance measuring sensor 5, and the projector 8 may be tilted in a direction toward the back surface side.

Figure 32:
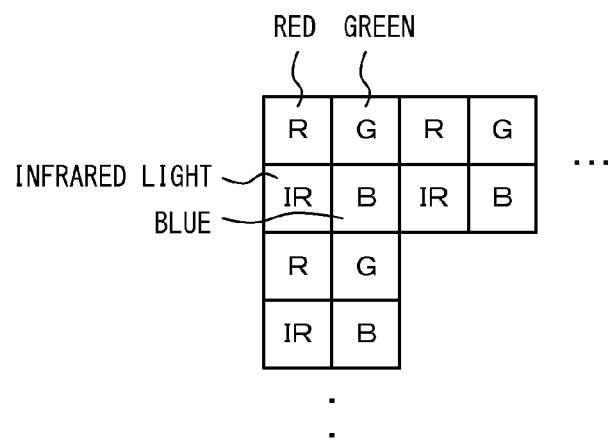
FIG. 32 is an example non-limiting diagram showing a portion of an image sensor capable of capturing both an RGB image and an infrared image.

In the above-described embodiment, the infrared camera 4 is used. However, instead of the infrared camera 4, a normal camera which captures an image of visible light (a camera which obtains an RGB image) may be used, and a gesture made by the user may be recognized by using the normal camera. In addition, instead of the infrared camera 4, a camera capable of capturing both an RGB image and an infrared image may be used. FIG. 32 is a diagram showing a portion of an image sensor capable of capturing both an RGB image and an infrared image. As shown in FIG. 32, four elements (phototransistors) receive red light (R), green light (G), blue light (B), and infrared light (IR), respectively. By using an image sensor in which a large number of combinations of such four elements are arranged in rows and columns, an RGB image can be obtained, and an infrared image can be obtained. Thus, a gesture can be recognized by using either the RGB image or the infrared image. That is, an image suitable for gesture recognition can be selected from the obtained RGB image and infrared image. For example, when a specific object cannot be detected in the obtained infrared image due to an excessive amount of infrared light, a gesture can be recognized by using the RGB image, and vice versa.

In the above-described embodiment, the projector 8 is provided. However, any component may be provided as long as the component notifies the user of a result of the predetermined information processing (S13) corresponding to a gesture input performed by the user, by means of light. For example, instead of or in addition to the projector 8, a light source (e.g., an LED, a halogen lamp, a fluorescent lamp, an EL lamp, etc.) which emits predetermined light may be provided to the portable electronic apparatus 1.

In the above-described embodiment, an image and a distance are obtained separately by using the infrared camera 4 and the distance measuring sensor 5. However, in another embodiment, for example, a TOF (Time Of Flight) type distance image sensor may be provided, and an image and a distance for each pixel may be obtained by using this distance image sensor. The portable electronic apparatus detects a specific object on the basis of the obtained image and distance, and outputs an image to the display 2 or the projector 8 in accordance with a result of the detection.

In the above-described embodiment, the portable electronic apparatus 1 has been described as an information processing apparatus capable of executing an application. However, in another embodiment, the portable electronic apparatus 1 may serve as a controller which accepts an input performed by the user. In this case, the display may be provided to the portable electronic apparatus 1, or may not be provided to the portable electronic apparatus 1. In the case where the portable electronic apparatus 1 serves as a controller, the portable electronic apparatus 1 is connected to another information processing apparatus wirelessly or via a wire. When an operation (an operation with respect to the input button, an operation of moving the portable electronic apparatus 1 itself, the above-described gesture operation, etc.) is performed with respect to the portable electronic apparatus 1, operation data corresponding to this operation is transmitted to the other information processing apparatus. Upon reception of the operation data, the other information processing apparatus performs a process corresponding to the operation data. The process corresponding to the operation data is different depending on the type of an application to be executed.

In the above-described embodiment, the example where the portable electronic apparatus is held with one hand and a gesture input is performed with the other hand with respect to the portable electronic apparatus, has been described. In another embodiment, the portable electronic apparatus may be one that is to be fixed to an arm (body) of the user, such as a watch-type apparatus including a screen.

The shape of the portable electronic apparatus may be any shape, and may be, for example, a plate-like elliptical shape. For example, the electronic apparatus may be foldable.

In the above-described embodiment, the portable apparatus has been described, but a stationary apparatus may be used in another embodiment.

A hand-held electronic apparatus according to another embodiment includes: a distance measuring sensor; a detector configured to detect a movement of an object on the basis of information from the distance measuring sensor; and a processor configured to perform predetermined information processing on the basis of a result of detection by the detector.

In the above hand-held electronic apparatus according to the other embodiment, the detector may detect a movement of one hand of the user, and the processor may perform the predetermined information processing in accordance with the movement of the one hand of the user detected by the detector.

In the above hand-held electronic apparatus according to the other embodiment, a held portion to be held by the other hand of the user may be provided at least at a portion different from a portion in which the distance measuring sensor is provided.

The above hand-held electronic apparatus according to the other embodiment may further include a display between the held portion and the distance measuring sensor, the display being configured to display a result of the predetermined information processing.

The above hand-held electronic apparatus according to the other embodiment may further include a camera, and the detector may detect the object on the basis of an image from the camera.

In the above hand-held electronic apparatus according to the other embodiment, the camera may be disposed near the distance measuring sensor.

In the above hand-held electronic apparatus according to the other embodiment, the camera may be directed in the same direction as a detection direction of the distance measuring sensor.

In the above hand-held electronic apparatus according to the other embodiment, the detector may detect a gesture made by the user, on the basis of the image from the camera, and may detect a distance to the object on the basis of the information from the distance measuring sensor.

In the above hand-held electronic apparatus according to the other embodiment, the camera may be a camera capable of receiving infrared light.

In the above hand-held electronic apparatus according to the other embodiment, the distance measuring sensor may be provided at a side surface of the hand-held electronic apparatus.

In the above hand-held electronic apparatus according to the other embodiment, the processor may perform, as the predetermined information processing, a predetermined right/wrong determination based on the result of the detection by the detector, and may perform game processing on the basis of a result of the right/wrong determination.

In the above hand-held electronic apparatus according to the other embodiment, the distance measuring sensor may be a sensor having directivity and may detect a distance to the object present in a specific direction.

The above hand-held electronic apparatus according to the other embodiment may further include an input section configured to accept an input performed by the user, and the processor may perform the predetermined information processing also on the basis of the input performed on the input section.

The above hand-held electronic apparatus according to the other embodiment may further include a sound output section configured to output a sound.

The above hand-held electronic apparatus according to the other embodiment may be a game apparatus.

A hand-held electronic apparatus according to another embodiment includes: a distance measuring sensor; a camera; a selector configured to select at least one of the distance measuring sensor and the camera; a detector configured to detect an object on the basis of information from the distance measuring sensor or the camera selected by the selector; and a processor configured to perform predetermined information processing on the basis of a result of detection by the detector.

In the above hand-held electronic apparatus according to the other embodiment, the processor may be capable of executing a plurality of types of applications, and the selector may select any one of the distance measuring sensor and the camera in accordance with a type of an application to be executed by the processor.

In the above hand-held electronic apparatus according to the other embodiment, the selector may select the camera when an application using a result of detection of a specific object is executed by the processor, and may select the distance measuring sensor when an application using a result of detection of a distance to an unspecified object is executed by the processor.

In the above hand-held electronic apparatus according to the other embodiment, the processor may be capable of executing a predetermined application, and the selector may select any one of the distance measuring sensor and the camera in accordance with a situation when the predetermined application is executed by the processor.

In the above hand-held electronic apparatus according to the other embodiment, the detector may detect a gesture made by a user, on the basis of an image from the camera, and may detect a distance to a specific object with which the gesture is made, on the basis of information from the distance measuring sensor, and the selector may select the camera when a gesture made by the user can be detected by the detector, and may select the distance measuring sensor when a gesture made by the user cannot be detected by the detector.

In the above hand-held electronic apparatus according to the other embodiment, the selector may select both the distance measuring sensor and the camera, and the processor may perform the predetermined information processing on the basis of a distance detected by the distance measuring sensor and an image captured by the camera.

A hand-held electronic apparatus according to another embodiment includes: a housing; a display provided at a front surface of the housing; a distance measuring sensor provided at one side surface of the housing; and a processor configured to perform predetermined information processing on the basis of information from the distance measuring sensor.

In the above hand-held electronic apparatus according to the other embodiment, a held portion to be held by a user is provided at a side opposite to a portion in which the distance measuring sensor is provided.

An electronic apparatus according to another embodiment includes: a camera; an acquirer configured to acquire an input image captured by the camera; a detector configured to detect a gesture made by a user, on the basis of the input image acquired by the acquirer; and an irradiation section configured to emit light in a direction toward an object related to the gesture, on the basis of a result of detection by the detector.

In the above electronic apparatus according to the other embodiment, the direction in which the light is emitted by the irradiation section may be the same direction as an imaging direction of the camera.

In the above electronic apparatus according to the other embodiment, the detector may detect a predetermined portion of a body of the user.

In the above electronic apparatus according to the other embodiment, the detector may detect a gesture made with a hand of the user.

The above electronic apparatus according to the other embodiment may be a hand-held electronic apparatus which is capable of being operated by the user while being held with a hand of the use, a held portion to be held with one hand of the user may be provided, and the detector may detect a gesture made with the other hand of the user.

In the above electronic apparatus according to the other embodiment, the irradiation section may be a projector.

In the above electronic apparatus according to the other embodiment, the irradiation section may project an image corresponding to the result of the detection by the detector, as emission of the light.

In the above electronic apparatus according to the other embodiment, the irradiation section may continuously project the image in accordance with the gesture continuously made.

In the above electronic apparatus according to the other embodiment, the irradiation section may project the image onto a predetermined portion of the body of the user.

The above electronic apparatus according to the other embodiment may further include a display configured to display an image, an image may be projected by the irradiation section, and an image may be displayed on the display.

The above electronic apparatus according to the other embodiment may further include a link section configured to link the image projected by the irradiation section with the image displayed on the display.

In the above electronic apparatus according to the other embodiment, the detector may detect a position of the object related to the gesture, and the irradiation section may emit light on the basis of the position detected by the detector.

The above electronic apparatus according to the other embodiment may further include a game processor configured to perform predetermined game processing on the basis of the result of the detection by the detector, and the irradiation section may emit light on the basis of a result of the game processing.

The above electronic apparatus according to the other embodiment may include a sound output section configured to output a sound in accordance with the result of the detection by the detector.

In the above electronic apparatus according to the other embodiment, the camera and the irradiation section may be provided at a side surface of the electronic apparatus.

In the above electronic apparatus according to the other embodiment, the irradiation section may be a light source which emits light of a predetermined color.

An electronic apparatus according to another embodiment includes: a camera; an acquirer configured to acquire an input image captured by the camera; a detector configured to detect a movement of a specific object on the basis of the input image acquired by the acquirer; and an irradiation section configured to emit light in a direction toward the specific object on the basis of a result of detection by the detector.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:
1. A hand-held electronic apparatus comprising:
an information processor;
a housing;
an input section of the apparatus which can be operated by a user;
a display provided at a front surface of the housing;
a camera configured to capture an image in a side surface direction of the housing;
an irradiation section which emits infrared light in a side surface direction of the housing at a predetermined time interval in synchronization with a timing at which an image is captured by the camera; and a held portion of the housing to be held by a user, the held portion provided in the housing at a side opposite to the side of the housing used as an imaging direction for the camera;

wherein the input section can be operated by the user with their hand holding the held portion, wherein the information processor is configured to function as:

an image acquirer to acquire and process an input image captured by the camera;

a detector to detect a specific object based upon the input image acquired by the image acquirer; and a display controller to cause an output image corresponding to a result of detection by the detector to be displayed on the display, wherein information processing is performed by the information processor based on the input image captured by the camera and a user operation performed on the input section, wherein in a case where the specific object is detected based upon the input image, and when the user operation is performed on the input section, first information processing is performed, and wherein in a case where the specific object is detected based upon the input image, and when the user operation is not performed on the input section, second information processing different from the first information processing is performed.

2. The hand-held electronic apparatus according to claim 1, wherein the detector detects a gesture made by a user.

3. The hand-held electronic apparatus according to claim 1, wherein the camera is provided at a side surface of the housing.

4. The hand-held electronic apparatus according to claim 1, wherein the detector detects a gesture made with a hand of the user opposite to a hand of the user that holds the held portion.

5. The hand-held electronic apparatus according to claim 1, wherein the input section capable of being operated by the user at least with the hand holding the held portion is provided to the held portion.

6. The hand-held electronic apparatus according to claim 5, wherein the input section is operated with a finger capable of being moved when the held portion is held.

7. The hand-held electronic apparatus according to claim 5, wherein the input section comprises at least one push button.

8. The hand-held electronic apparatus according to claim 3, wherein the housing has a rectangular shape, and the camera is provided at a short side of the housing.

9. The hand-held electronic apparatus according to claim 1, further comprising a game processor configured to perform game processing on the basis of the result of the detection by the detector, wherein the display controller causes an output image corresponding to a result of the game processing to be displayed on the display.

10. The hand-held electronic apparatus according to claim 1, wherein the camera is a camera capable of receiving infrared light.

11. The hand-held electronic apparatus according to claim 1, further comprising a vibration controller configured to operate a vibrator for providing vibration to a user, in accordance with the result of the detection by the detector.

12. The hand-held electronic apparatus according to claim 1, wherein the detector obtains position information of a specific object present in the side surface direction of the housing, and the display controller causes the output image to be displayed on the display on the basis of the position information.

13. The hand-held electronic apparatus according to claim 1, wherein the detector detects a gesture made by a user with the specific object, and obtains position information of the specific object present in the side surface direction of the housing, and the display controller causes the output image to be displayed on the display on the basis of the position information and the gesture.

14. The hand-held electronic apparatus according to claim 1, wherein a touch panel is provided on the display.

15. The hand-held electronic apparatus according to claim 1, further comprising a sound controller configured to cause a sound to be outputted in accordance with the result of the detection by the detector.

16. A hand-held electronic apparatus comprising:

a housing;

a display provided at a front surface of the housing;

a camera configured to capture an image in a side surface direction of the housing;

an irradiation section which emits infrared light in a side surface direction of the housing at a predetermined time interval in synchronization with a timing at which an image is captured by the camera, a held portion of the housing to be held by a user, the held portion provided in the housing at a side opposite to the side of the housing used as an imaging direction for the camera;

an input section which can be operated by a user with their hand holding the held portion; and a processor configured to:

detect a gesture made by a user's hand based on the captured image;

perform a predetermined process in an application program; and generate an output image to be displayed on the display, the output image corresponding to the detected gesture and the performed process, wherein information processing is performed by the processor based on the input image captured by the camera and a user operation performed on the input section, wherein in a case where the specific object is detected based on the input image, and when the user operation is performed on the input section, first information processing is performed, and wherein in a case where the specific object is detected based on the input image, and when the user operation is not performed on the input section, second information processing different from the first information processing is performed.

17. A hand-held electronic apparatus comprising:

a housing including a first side, a second side opposite the first side, and a front surface;

the housing further including a holdable portion configured to be held by a hand of a user, the holdable portion of the housing provided at the second side of the housing opposite the first side, at least one user-manipulable input device disposed on the housing, the at least one user-manipulable input device configured to be operated by the hand of the user while said hand holds the holdable portion, a camera configured to capture, using an image capture timing, images in an imaging direction associated with the first side of the housing;

an infrared emitter which intermittently emits infrared light in the imaging direction associated with the first side of the housing, at a timing that is synchronized with the image capture timing used by the camera;

a display provided at the housing front surface; and an information processor operatively coupled to the at least one user-manipulable input device, the camera, the display and the infrared emitter, the information processor configured to:

acquire images captured by the camera;

detect a specific object based upon acquired images;

detect whether or not a predetermined user operation is performed using the at least one user-manipulable input device;

perform first information processing upon detecting both (a) the specific object and (b) the predetermined user operation is performed, and perform second information processing different from the first information processing upon detecting both (a) the specific object and (c) the predetermined user operation is not performed.

* * * * *